United States Patent
Solovyev et al.

(10) Patent No.: US 11,997,296 B2
(45) Date of Patent: May 28, 2024

(54) MOTION FIELD STORAGE OPTIMIZATION FOR A LINE BUFFER

(71) Applicant: Huawei Technologies Co., Ltd., Shenzhen (CN)

(72) Inventors: Timofey Mikhailovich Solovyev, Moscow (RU); Roman Igorevich Chernyak, Moscow (RU); Alexander Alexandrovich Karabutov, Moscow (RU); Sergey Yurievich Ikonin, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 204 days.

(21) Appl. No.: 17/571,175

(22) Filed: Jan. 7, 2022

(65) Prior Publication Data
US 2022/0132150 A1 Apr. 28, 2022

Related U.S. Application Data

(63) Continuation of application No. PCT/RU2020/050153, filed on Jul. 9, 2020.

(30) Foreign Application Priority Data

Jul. 11, 2019 (WO) .................. PCT/EP2019/068766

(51) Int. Cl.
*H04N 19/176* (2014.01)
*H04N 19/433* (2014.01)
(Continued)

(52) U.S. Cl.
CPC ........... *H04N 19/433* (2014.11); *H04N 19/52* (2014.11); *H04N 19/96* (2014.11)

(58) Field of Classification Search
None
See application file for complete search history.

(56) References Cited

U.S. PATENT DOCUMENTS

| | | |
|---|---|---|
| 2015/0023409 A1 | 1/2015 | Schierl et al. |
| 2017/0118466 A1 | 4/2017 | Nakagami |

(Continued)

FOREIGN PATENT DOCUMENTS

| | | |
|---|---|---|
| WO | 2012095466 A1 | 7/2012 |
| WO | 2015102975 A2 | 7/2015 |
| WO | 2019231778 A1 | 12/2019 |

OTHER PUBLICATIONS

Ye et al., "CE4-related: Reduce line buffer for additional merge candidates," Joint Video Experts Team (JVET) of ITU-T SG 16 WP 3 and ISO/IECJTC 1/SC 29/WG11, 11th Meeting: Ljubljana, SI, Document: JVET-K0297, XP030199850, Total 7 pages, International Union of Telecommunication, Geneva, Switzerland (Jul. 10-18, 2018).

(Continued)

*Primary Examiner* — Samuel D Fereja
(74) *Attorney, Agent, or Firm* — Leydig, Voit & Mayer, Ltd.

(57) ABSTRACT

A method for deriving motion information for a current block includes: determining whether the current block and a top neighboring block of the current block are in a same coding tree unit (CTU) or not; obtaining a position of a spatial motion information candidate for the current block; obtaining motion information corresponding to the position of the spatial motion information candidate, depending on the result of whether the current block and top neighboring block of the current block are in the same CTU; adding the obtained motion information to a motion information candidate list for the current block; obtaining a value of a first index of a motion information candidate; and deriving (Continued)

motion information of the current block based on the motion information candidate list and the value of the first index.

17 Claims, 17 Drawing Sheets

(51) Int. Cl.
*H04N 19/52* (2014.01)
*H04N 19/96* (2014.01)

(56) References Cited

U.S. PATENT DOCUMENTS

| | | | |
|---|---|---|---|
| 2019/0373279 A1* | 12/2019 | Ye | H04N 19/96 |
| 2021/0243467 A1* | 8/2021 | Zhang | H04N 19/54 |
| 2023/0188728 A1* | 6/2023 | Lee | H04N 19/176 |
| | | | 375/240.16 |

OTHER PUBLICATIONS

Hsiao et al., "CE2-related: Simplifications for inherited affine candidates," Joint Video Experts Team (JVET) of ITU-T SG 16 WP 3 and ISO/IECJTC 1/SC 29/WG11, 13th Meeting: Marrakech, MA, Document: JVET-M0168-v1, XP030201036, Total 8 pages, International Union of Telecommunication, Geneva, Switzerland (Jan. 9-18, 2019).

Huang et al., "CE4-related: Affine clean-up and constrained affine inheritance for local and line buffer reduction," Joint Video Experts Team (JVET) of ITU-T SG 16 WP 3 and ISO/IEC JTC 1/SC 29/WG11, 12th Meeting: Macao, CN, Document: JVET-L0690, XP030251746, Total 4 pages, International Union of Telecommunication, Geneva, Switzerland (Oct. 3-12, 2018).

Solovyev et al., "Non-CE4: Motion field storage optimization for the line buffer," Joint Video Experts Team (JVET) of ITU-T SG 16 WP 3 and ISO/IECJTC 1/SC 29/WG11, 16th Meeting: Geneva, CH, Document: JVET-P0604-v2, XP030217829, Total 4 pages International Union of Telecommunication, Geneva, Switzerland (Oct. 1-11, 2019).

Bossen et al., "Non-CE4: On Temporal Motion Buffer Compression," Joint Video Experts Team (JVET) of ITU-T SG 16 WP 3 and ISO/IECJTC 1/SC 29/WG11, 13th Meeting: Marrakech, MA, Document: JVET-M0512, XP030201598, Total 3 pages, International Union of Telecommunication, Geneva, Switzerland (Jan. 9-18, 2019).

Wang et al., "CE4-related: Non-square compression unit for temporal motion data storage," Joint Video Experts Team (JVET) of ITU-T SG 16 WP 3 and ISO/IEC JTC 1/SC 29/WG11, 13th Meeting: Marrakech, MA, Document: JVET-M0346, XP030200456, Total 4 pages, International Union of Telecommunication, Geneva, Switzerland (Jan. 9-18, 2019).

Huang et al., CE2 Size constrain for inherited affine motion prediction (test 2.4.7), Joint Video Experts Team (JVET) of ITU-T Sg 16 WP 3 and ISO/IEC JTC 1/SC 29/WG11, 13th Meeting: Marrakech, MA, Document: JVET-M0053, XP030200996, Total 2 pages, International Union of Telecommunication, Geneva, Switzerland (Jan. 9-18, 2019).

Huang et al., "CE4-related: Size constrain for inherited affine motion prediction," Joint Video Experts Team (JVET) of ITU-T SG 16 WP 3 and 1S0/IEC JTC 1/SC 29/WG 11, 12th Meeting: Macao, CN, Document: JVET-L0281, XP030193817, Total 3 pages, International Union of Telecommunication, Geneva, Switzerland (Oct. 3-12, 2018).

Bross et al., "Versatile Video Coding (Draft 5)," Joint Video Experts Team (JVET) of ITU-T SG 16 WP 3 and ISO/IEC JTC 1/SC 29/WG 11, Document: JVET-N1001-v10, 14th Meeting: Geneva, CH, Total 406 pages (Mar. 19-27, 2019).

Chen et al., "Algorithm description for Versatile Video Coding and Test Model 5 (VTM 5)," Joint Video Experts Team (JVET) of ITU-T SG 16 WP 3 and ISO/IEC JTC 1/SC 29/WG 11, Document: JVET-N1002-v2, 14th Meeting: Geneva, CH, Total 78 pages (Mar. 19-27, 2019).

* cited by examiner $$\begin{cases} mv_x = \dfrac{mv_{1x} - mv_{0x}}{W} x + \dfrac{mv_{1y} - mv_{0y}}{W} y + mv_{0x} \\ mv_y = \dfrac{mv_{1y} - mv_{0y}}{W} x + \dfrac{mv_{1y} - mv_{0x}}{W} y + mv_{0y} \end{cases}$$

Affine model derivation

Affine motion vector field per subblock

MOTION FIELD STORAGE OPTIMIZATION FOR A LINE BUFFER

CROSS-REFERENCE TO RELATED APPLICATIONS

This application is a continuation of International Application No. PCT/RU2020/050153, filed on Jul. 9, 2020, which claims priority of International Application No. PCT/EP2019/068766, filed on Jul. 11, 2019. The disclosures of the aforementioned applications are hereby incorporated by reference in their entireties.

TECHNICAL FIELD

Embodiments of the present application (disclosure) generally relate to the field of picture processing and more particularly to inter prediction, especially to motion vector and reference index merging.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

The present disclosure provides apparatuses and methods for encoding and decoding video. In particular, the present disclosure provides apparatuses and methods for motion information inheritance.

According to a first aspect of the disclosure, a method for deriving motion information for a current block is provided. The method comprises determining whether the current block and a top neighboring block of the current block are in a same coding tree unit (CTU) or not; obtaining a position of a spatial motion information candidate for the current block; obtaining motion information corresponding to the position of the spatial motion information candidate, depending on the result of whether the current block and the top neighboring block of the current block are in the same CTU; adding the obtained motion information to a motion information candidate list for the current block; obtaining a value of a first index of a motion information candidate; deriving motion information of the current block based on the motion information candidate list and the value of the first index.

In other words, a method for deriving motion information for a current block is provided. The method comprises: obtaining a position of a spatial motion information candidate for the current block; determining whether the spatial motion information candidate for the current block is located on top of the current block; determining whether the current block and the (position of) spatial motion information candidate for the current block are in a same coding tree unit (CTU) or not; obtaining motion information corresponding to the spatial motion information candidate position, depending on the result of whether the spatial motion information candidate for the current block is located on top of the current block and whether the current block and the (position of) spatial motion information candidate for the current block are in the same CTU; adding the obtained motion information to a motion information candidate list for the current block; obtaining a value of a first index of a motion information candidate; deriving motion information of the current block based on the motion information candidate list and the value of the first index.

With this approach, the amount of data required to be buffered may be reduced, as the motion information stored for a neighboring block not included in the same CTU as the current block may be stored/accessed in a different manner than the motion information of a neighboring block included in the same CTU as the current block.

For instance, when determining whether the spatial motion information candidate for the current block is located in top of the current block, it may be determined whether the vertical coordinate of the spatial motion information candidate is less than a vertical coordinate of the top left and/or top right corner of the current block.

In an embodiment, the motion information corresponding to the position of the spatial motion information candidate is obtained according to the following process, when the current block and the top neighboring block of the current block are in the same CTU: obtaining a horizontal coordinate in a motion buffer, by division of a horizontal coordinate of the spatial motion information candidate by a first value N, wherein N is an integer value that is a power of two; obtaining a vertical coordinate in the motion buffer, by division of a vertical coordinate of the spatial motion information candidate by the first value N.

In an embodiment, the motion information corresponding to the position of the spatial motion information candidate is obtained according to the following process, when the current block and the top neighboring block of the current block are not in the same CTU: obtaining a horizontal coordinate in a motion buffer, by division of a horizontal coordinate of the spatial motion information candidate by a second value M, where M is an integer value that is a power of two; obtaining a vertical coordinate in the motion buffer, by division of a vertical coordinate of the spatial motion information candidate by a third value K, wherein K is an integer value that is a power of two.

In other words, depending on whether the top neighboring block of the current block is within the same CTU as the current block or not, the position of the motion information within the motion buffer may be expressed as a horizontal and a vertical coordinate. Said coordinates of the motion information within the motion buffer may be determined by dividing the horizontal and vertical positon of a motion information candidate relative to the current block by a value N or a value M (horizontal) or K (vertical), depending on whether the top neighboring block is within the same CTU or not.

In an embodiment, the value K may be different from the value N. For instance, M may be larger than N.

In an example, N is equal to 4.

In an example, M is equal to 8.

In an embodiment, the first value N is equal to the third value K.

In an embodiment, an inheritance of an affine motion model from a neighboring block is forbidden if the following conditions are met: (i) the neighboring block is a top neighboring block for the current block, (ii) the neighboring block and the current block are not in the same CTU, and (iii) the neighboring block width is equal to the second value M.

With this approach, a case where a derivation of affine motion vectors would result in incorrect results may be prevented. Specifically, in a case where M is equal to the width of the neighboring block, the obtained motion candidate would not be considered in affine (subblock) candidate list construction.

In an embodiment, an inheritance of an affine motion model from a neighboring block is forbidden of the following conditions are met: (i) the neighboring block is a top neighboring block for the current block, (ii) the neighboring block and the current block are not in the same CTU, and (iii) a horizontal coordinate of the neighboring block is not a multiple of the second value M.

With this approach, a case where a derivation of affine motion vectors would result in incorrect results may be prevented. Specifically, in a case where M is equal to a horizontal coordinate of the neighboring block, the obtained motion candidate would not be considered in affine (subblock) candidate list construction.

In an example, the motion information candidate list is a merge list.

A merge list may include motion information candidates, which may have been constructed from spatial neighboring blocks, collocated blocks, history based motion vector predictors, averaged motion vector predictors, or zero motion vectors, for instance.

In a further example, the motion information candidate list is a motion vector predictors list.

In other words, a list of motion vector predictors may represent the motion information candidate list. Here, a motion vector predictors list may be a list of motion vector predictors, for instance, from motion vectors of spatially and/or temporally neighboring blocks.

A motion vector predictors list may also be called an advanced motion vector prediction (AMVP) list, or a motion vector prediction (MVP) list.

In a further example, the motion information candidate list is an affine inherited candidate list.

In other words, the motion information candidate list may be a list including motion information candidates inherited from another block. For instance, the motion information candidates may be inherited from one or more associated neighboring blocks. Further, for instance, the inherited affine candidates may be derived from a left neighboring block and/or an above neighboring block.

In a further example, the motion information candidate list is an affine constructed candidate list.

That is, in other words, the motion information candidate list may be a list, which includes constructed affine candidates, which may be constructed by combining neighbor translational motion information of certain control points, for instance.

In a further example, the motion information candidate list is a subblock merge list.

In other words, the motion information candidate list may be a list, which has been merged from motion information on a subblock basis.

In a further example, the motion information candidate list is an affine motion vector predictor list.

That is, the motion information candidates list may be a list including affine motion vector predictors. For instance, the affine motion vector predictors may be inherited affine motion vector predicted candidates extrapolated from motion vectors of a neighboring block, constructed affine motion vector prediction candidates derived using motion vectors of the neighboring block, motion vectors from neighboring blocks or zero motion vectors.

In a further example, the motion information candidate list is an intra block copy merge list.

The intra block copy merge list may, for instance, include block vectors from neighboring candidate blocks coded using an intra-block copy procedure.

In an embodiment, when the current block and the top neighboring block of the current block are not in the same CTU and the motion information is obtained according to an affine mode, affine motion model parameters are derived based on motion information of subblocks with coordinates x and x+w/2, wherein x is a horizontal coordinate of the top neighboring block and w is a width of the top neighboring block.

In other words, in an embodiment, when the current block and the top neighboring block of the current block are not in the same CTU and the motion information is obtained according to an affine mode, the motion information corresponding to the spatial motion information candidate is obtained using subblocks with coordinates x and x+w/2, wherein x is a horizontal coordinate of the top neighboring block and w is a width of the top neighboring block.

According to a second aspect of the disclosure, a method for deriving motion information for a current block is provided. The method comprises determining whether the current block and a top neighboring block of the current block are in a same coding tree unit (CTU) or not; obtaining a position of a spatial motion information candidate for the current block, depending on the result of whether the current block and the top neighboring block of the current block are in the same CTU; obtaining motion information corresponding to the position of the spatial motion information candidate; adding the obtained motion information to a motion information candidate list for the current block; obtaining a value of a first index of a motion information candidate; deriving motion information of the current block based on the motion information candidate list and the value of the first index.

With this approach, the amount of data required to be buffered may be reduced, as the motion information stored for a neighboring block not included in the same CTU as the current block may be stored/accessed in a different manner than the motion information of a neighboring block included in the same CTU as the current block.

In an embodiment, the position of the spatial motion information candidate is obtained according to the following process, when the current block and the top neighboring block of the current block are in the same CTU: obtaining a horizontal coordinate in a motion buffer, by division of a horizontal coordinate of the spatial motion information candidate by a first value N, wherein N is an integer value that is a power of two; obtaining a vertical coordinate in the motion buffer, by division of a vertical coordinate of the spatial motion information candidate by the first value N.

In an embodiment, the position of the spatial motion information candidate is obtained according to the following process, when the current block and the top neighboring block of the current block are not in the same CTU: obtaining a horizontal coordinate in a motion buffer, by division of a horizontal coordinate of the spatial motion information candidate by a second value M, where M is an integer value that is a power of two; obtaining a vertical coordinate in the motion buffer, by division of a vertical coordinate of the spatial motion information candidate by a third value K, wherein K is an integer value that is a power of two.

In other words, depending on whether the top neighboring block of the current block is within the same CTU as the current block or not, the position of the motion information within the motion buffer may be expressed as a horizontal and a vertical coordinate. Said coordinates of the motion information within the motion buffer may be determined by dividing the horizontal and vertical positon of a motion information candidate relative to the current block by a value N or a value M (horizontal) or K (vertical), depending on whether the top neighboring block is within the same CTU or not.

In an embodiment, the value K may be different from the value N. For instance, M may be larger than N.

For example, N is equal to 4.

For example, M is equal to 8.

In an embodiment, the first value N is equal to the third value K.

In an embodiment, an inheritance of an affine motion model from a neighboring block is forbidden if the following conditions are met: (i) the neighboring block is a top neighboring block for the current block, (ii) the neighboring block and the current block are not in the same CTU, and (iii) the neighboring block width is equal to the second value M.

With this approach, a case where a derivation of affine motion vectors would result in incorrect results may be prevented. Specifically, in a case where M is equal to the width of the neighboring block, the obtained motion candidate would not be considered in affine (subblock) candidate list construction.

In an embodiment, an inheritance of an affine motion model from a neighboring block is forbidden if of the following conditions are met: (i) the neighboring block is a top neighboring block for the current block, (ii) the neighboring block and the current block are not in the same CTU, and (iii) a horizontal coordinate of the neighboring block is not a multiple of the second value M.

With this approach, a case where a derivation of affine motion vectors would result in incorrect results may be prevented. Specifically, in a case where M is equal to a horizontal coordinate of the neighboring block, the obtained motion candidate would not be considered in affine (sub-block) candidate list construction.

In an example, the motion information candidate list is a merge list.

A merge list may include motion information candidates, which may have been constructed from spatial neighboring blocks, collocated blocks, history based motion vector predictors, averaged motion vector predictors, or zero motion vectors, for instance.

In an example, the motion information candidate list is a motion vector predictors list.

In other words, a list of motion vector predictors may represent the motion information candidate list. Here, a motion vector predictors list may be a list of motion vector predictors, for instance, from motion vectors of spatially and/or temporally neighboring blocks.

A motion vector predictors list may also be called an advanced motion vector prediction (AMVP) list, or a motion vector prediction (MVP) list.

In an example, the motion information candidate list is an affine inherited candidate list.

In other words, the motion information candidate list may be a list including motion information candidates inherited from another block. For instance, the motion information candidates may be inherited from one or more associated neighboring blocks. Further, for instance, the inherited affine candidates may be derived from a left neighboring block and/or an above neighboring block. In an example, the motion information candidate list is an affine constructed candidate list.

That is, in other words, the motion information candidate list may be a list, which includes constructed affine candidates, which may be constructed by combining neighbor translational motion information of certain control points, for instance.

In an example, the motion information candidate list is a subblock merge list.

In other words, the motion information candidate list may be a list, which has been merged from motion information on a subblock basis.

In an example, the motion information candidate list is an affine motion vector predictor list.

That is, the motion information candidates list may be a list including affine motion vector predictors. For instance, the affine motion vector predictors may be inherited affine motion vector predicted candidates extrapolated from motion vectors of a neighboring block, constructed affine motion vector prediction candidates derived using motion vectors of the neighboring block, motion vectors from neighboring blocks or zero motion vectors.

In an example, the motion information candidate list is an intra block copy merge list.

The intra block copy merge list may, for instance, include block vectors from neighboring candidate blocks coded using an intra-block copy procedure.

In an embodiment, when the current block and the top neighboring block of the current block are not in the same CTU and the motion information is obtained according to an affine mode, affine motion model parameters are derived based on motion information of subblocks with coordinates x and x+w/2, wherein x is a horizontal coordinate of the top neighboring block and w is a width of the top neighboring block.

In other words, in an embodiment, when the current block and the top neighboring block of the current block are not in the same CTU and the motion information is obtained according to an affine mode, the spatial motion information candidate position is obtained using subblocks with coordinates x and x+w/2, wherein x is a horizontal coordinate of the top neighboring block and w is a width of the top neighboring block.

According to a further aspect of the disclosure, a device comprising processing circuitry configured to perform the method of the first aspect and/or the second aspect and/or any of their embodiments is provided.

According to a further aspect of the discloser, a computer program product is provided, the computer program product comprising program code which when executed by a processing device causes the processing device to perform a method according to the first and/or second aspect and/or any one of their embodiments.

According to another aspect of the disclosure, an encoder is provided. The encoder comprises processing circuitry for carrying out any one of the above-described methods.

According to another aspect of the disclosure, a decoder is provided. The decoder comprises processing circuitry for carrying out any one of the above-described methods.

According to another aspect of the disclosure, a computer program product comprising a program code for performing any one of the above-described methods is provided.

According to a further aspect, a decoder is provided. The decoder comprises one or more processors; and a non-transitory computer-readable storage medium coupled to the processors and storing programming for execution by the processors, wherein the programming, when executed by the processors, configures the decoder to carry out any one of the above-described methods.

According to a further aspect, an encoder is provided. The encoder comprises one or more processors; and a non-transitory computer-readable storage medium coupled to the processors and storing programming for execution by the processors, wherein the programming, when executed by the processors, configures the encoder to carry out any one of the above-described methods.

According to a further aspect, a non-transitory computer-readable medium is provided, the non-transitory computer-readable medium carries a program code which, when executed by a computer device, causes the computer device to perform any one of the above-described methods.

According to an aspect, an encoder for video encoding is provided, wherein motion information is derived for a current block. The encoder comprises means for determining whether the current block and a top neighboring block of the current block are in a same coding tree unit (CTU) or not; means for obtaining a position of a spatial motion information candidate for the current block; means for obtaining motion information corresponding to the position of the spatial motion information candidate, depending on the result of whether the current block and the top neighboring block of the current block are in the same CTU; means for adding the obtained motion information to a motion information candidate list for the current block; means for obtaining a value of a first index of a motion information candidate; means for deriving motion information of the current block based on the motion information candidate list and the value of the first index.

According to an aspect, a decoder for video decoding is provided, wherein motion information is derived for a current block. The decoder comprises means for determining whether the current block and a top neighboring block of the current block are in a same coding tree unit (CTU) or not; means for obtaining a position of a spatial motion information candidate for the current block; means for obtaining motion information corresponding to the position of the spatial motion information candidate, depending on the result of whether the current block and the top neighboring block of the current block are in the same CTU; means for adding the obtained motion information to a motion information candidate list for the current block; means for obtaining a value of a first index of a motion information candidate; means for deriving motion information of the current block based on the motion information candidate list and the value of the first index.

According to an aspect, an encoder for video encoding is provided, wherein motion information is derived for a current block. The encoder comprises means for determining whether the current block and a top neighboring block of the current block are in a same coding tree unit (CTU) or not; means for obtaining a position of a spatial motion information candidate for the current block, depending on the result of whether the current block and the top neighboring block of the current block are in the same CTU; means for obtaining motion information corresponding to the position of the spatial motion information candidate; means for adding the obtained motion information to a motion information candidate list for the current block; means for obtaining a value of a first index of a motion information candidate; means for deriving motion information of the current block based on the motion information candidate list and the value of the first index.

According to an aspect, a decoder for video decoding is provided, wherein motion information is derived for a current block. The decoder comprises means for determining whether the current block and a top neighboring block of the current block are in a same coding tree unit (CTU) or not; means for obtaining a position of a spatial motion information candidate for the current block, depending on the result of whether the current block and the top neighboring block of the current block are in the same CTU; means for obtaining motion information corresponding to the position of the spatial motion information candidate; means for adding the obtained motion information to a motion information candidate list for the current block; means for obtaining a value of a first index of a motion information candidate; means for deriving motion information of the current block based on the motion information candidate list and the value of the first index.

The encoding and the decoding methods defined in the claims, the description and the figures can each be performed by an encoding apparatus and a decoding apparatus, respectively.

An apparatus for encoding or for decoding a video stream may include a processor and a memory. The memory stores instructions that cause the processor to perform the encoding or decoding method.

For each of the encoding or decoding methods disclosed herein, a computer-readable storage medium is provided, the storage medium having stored thereon instructions that when executed cause one or more processors to encode or decode video data. The instructions cause the one or more processors to perform the respective encoding or decoding method.

Furthermore, for each of the encoding or decoding methods disclosed herein, a computer program product is provided. The computer program product comprises program code for performing the respective method.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the invention are described in more detail with reference to the attached figures and drawings, in which.

Figure 1A:
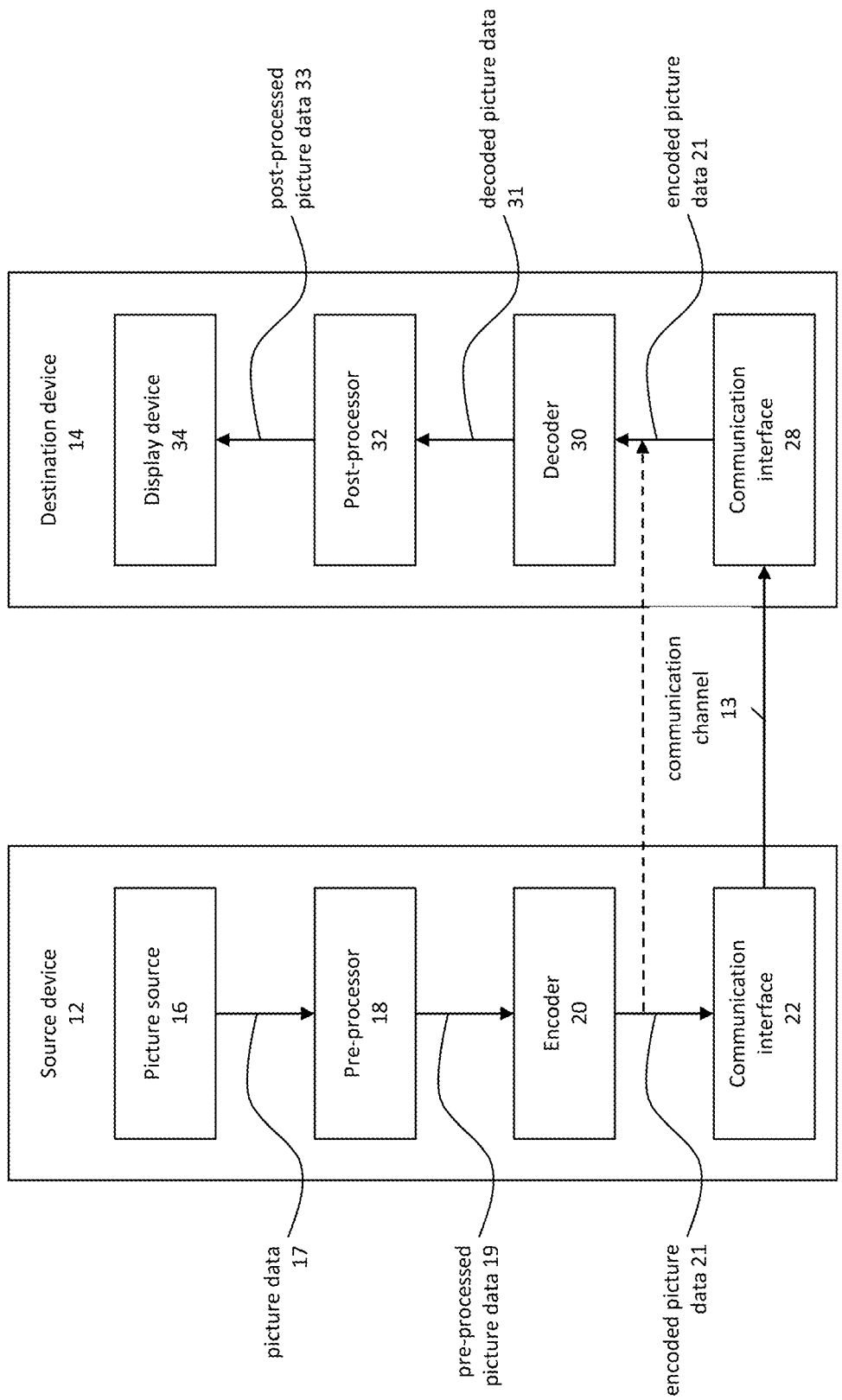
FIG. 1A is a block diagram showing an example of a video coding system configured to implement embodiments of the invention.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the invention may be used. It is understood that embodiments of the invention may be used in other aspects and comprise structural or logical changes not depicted in the figures. The following detailed description, therefore, is not to be taken in a limiting sense.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts, namely video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (e.g. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, e.g. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, e.g. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

The communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
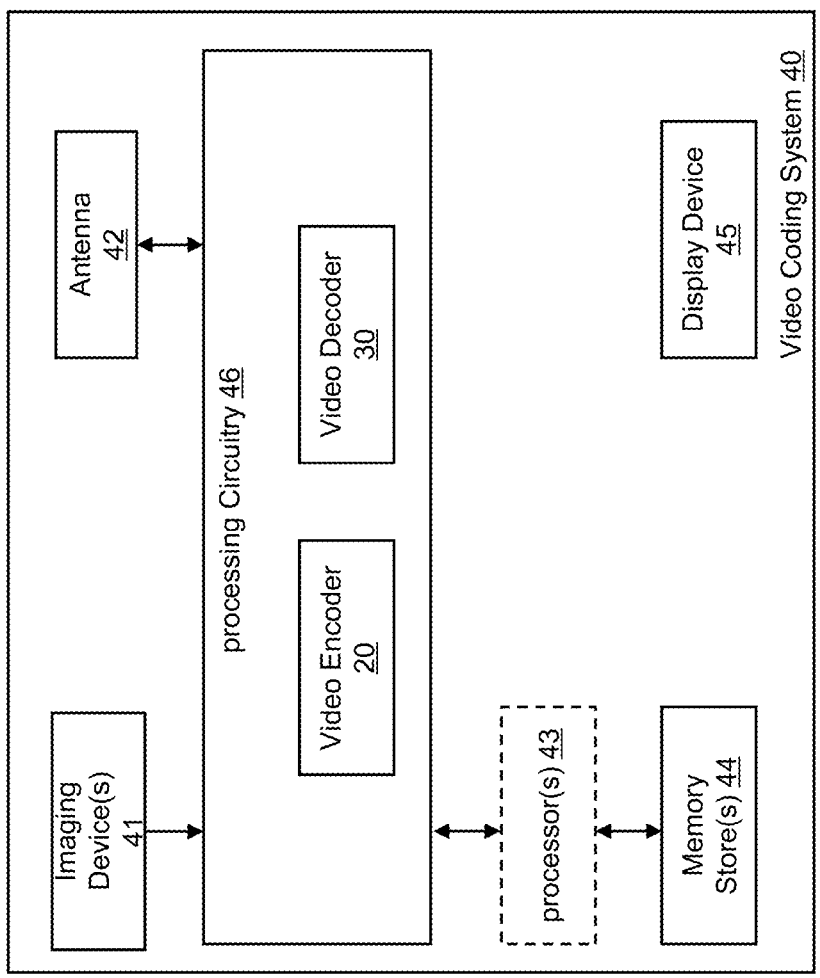
FIG. 1B is a block diagram showing another example of a video coding system configured to implement embodiments of the invention.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

Figure 2:
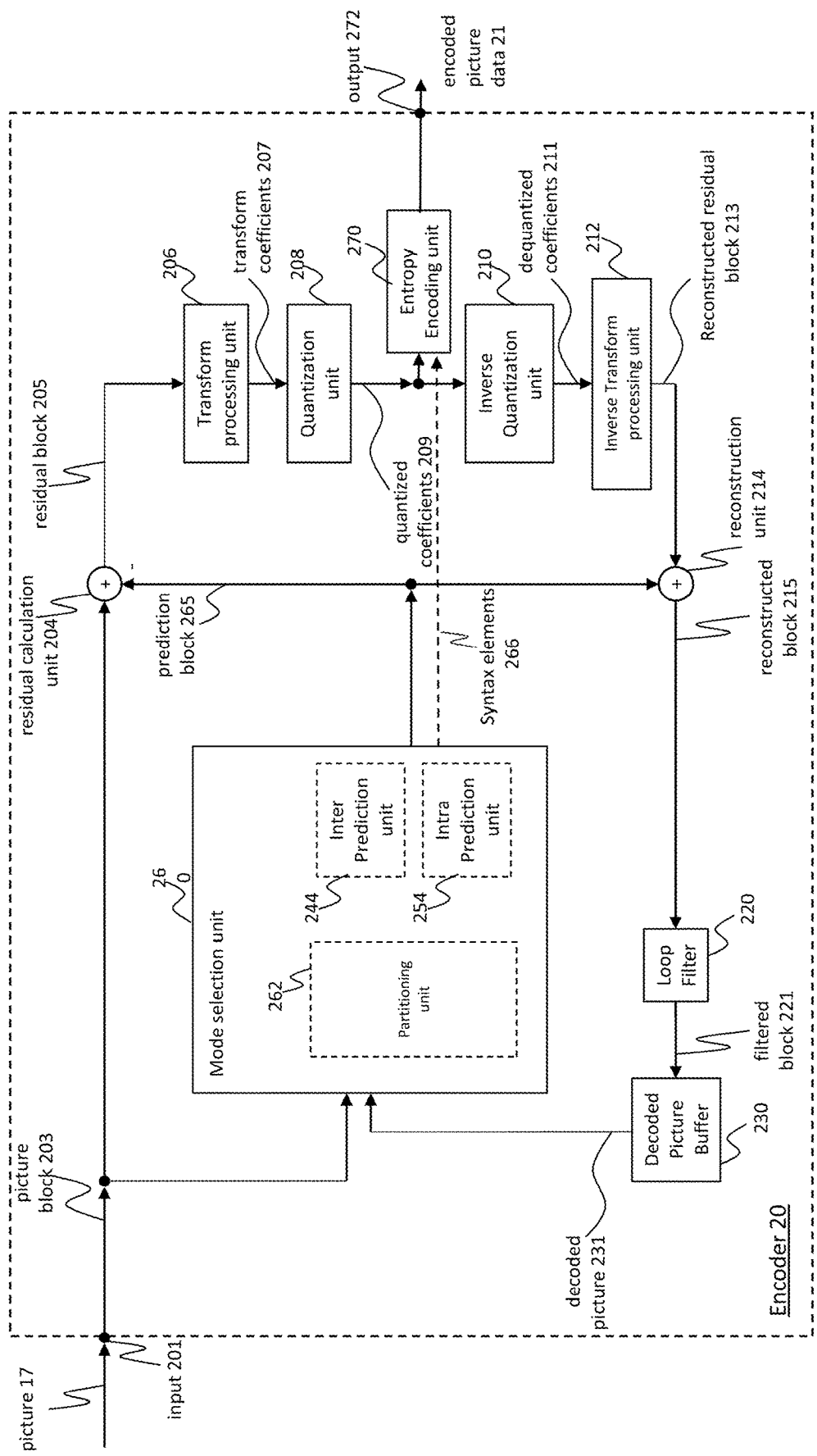
FIG. 2 is a block diagram showing an example of a video encoder configured to implement embodiments of the invention.
Figure 3:
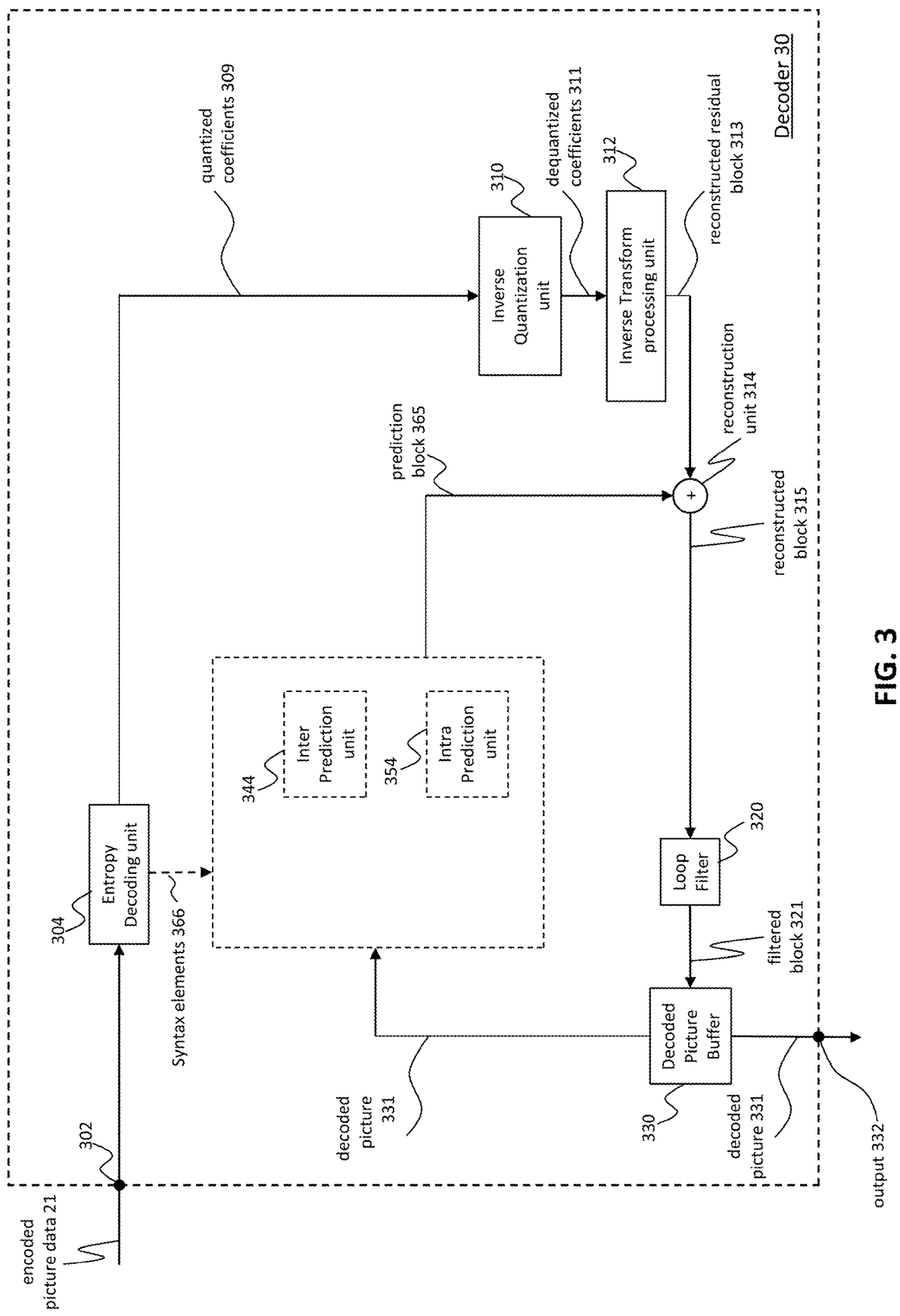
FIG. 3 is a block diagram showing an example structure of a video decoder configured to implement embodiments of the invention.

FIG. 1B is an illustrative diagram of another example video coding system 40 including encoder 20 of FIG. 2 and/or decoder 30 of FIG. 3 according to an exemplary embodiment. The system 40 can implement techniques in accordance with various examples described in the present application. In the illustrated implementation, video coding system 40 may include imaging device(s) 41, video encoder 20, video decoder 30 (and/or a video coder implemented via processing circuitry 46), an antenna 42, one or more processor(s) 43, one or more memory store(s) 44, and/or a display device 45.

As illustrated, imaging device(s) 41, antenna 42, processing circuitry 46, video encoder 20, video decoder 30, processor(s) 43, memory store(s) 44, and/or display device 45 may be capable of communication with one another. As discussed, although illustrated with both video encoder 20 and video decoder 30, video coding system 40 may include only video encoder 20 or only video decoder 30 in various examples.

As shown, in some examples, video coding system 40 may include an antenna 42. The antenna 42 may be configured to transmit or receive an encoded bitstream of video data, for example. Further, in some examples, the video coding system 40 may include a display device 45. The display device 45 may be configured to present video data. The processing circuitry 46 may include application-specific integrated circuit (ASIC) logic, graphics processor(s), general purpose processor(s), or the like. The video coding system 40 also may include optional processor(s) 43, which may similarly include application-specific integrated circuit (ASIC) logic, graphics processor(s), general purpose processor(s), or the like. In some examples, the processing circuitry 46 may be implemented via hardware, video coding dedicated hardware, or the like, and processor(s) 43 may be implemented by general purpose software, operating systems, or the like. In addition, memory store(s) 44 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 44 may be implemented by cache memory. In some examples, the processing circuitry 46 may access memory store(s) 44 (for implementation of an image buffer for example). In other examples, the processing circuitry 46 may include memory stores (e.g., cache or the like) for the implementation of an image buffer or the like.

In some examples, the video encoder 20 implemented via logic circuitry may include an image buffer (e.g., via either processing circuitry 46 or memory store(s) 44) and a graphics processing unit. The graphics processing unit may be communicatively coupled to the image buffer. The graphics processing unit may include the video encoder 20 as implemented via the processing circuitry 46 to embody the various modules as discussed with respect to FIG. 2 and/or any other encoder system or subsystem described herein. The processing circuitry 46 may be configured to perform the various operations as discussed herein.

The video decoder 30 may be implemented in a similar manner as implemented via processing circuitry 46 to embody the various modules as discussed with respect to decoder 30 of FIG. 3 and/or any other decoder system or subsystem described herein. In some examples, the video decoder 30 may be implemented via logic circuitry may include an image buffer (e.g., via either circuitry 46 or memory store(s) 44) and a graphics processing unit (e.g., via processing circuitry 46). The graphics processing unit may be communicatively coupled to the image buffer. The graphics processing unit may include video decoder 30 as implemented via processing circuitry 46 to embody the various modules as discussed with respect to FIG. 3 and/or any other decoder system or subsystem described herein.

In some examples, the antenna 42 of the video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). The video coding system 40 may also include the video decoder 30 coupled to the antenna 42 and configured to decode the encoded bitstream. The display device 45 may be configured to present video frames.

For convenience of description, embodiments of the invention are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC.

Encoder and Encoding Method

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video encoder 20 as shown in FIG. 2 may be further configured to partition and/or encode the picture by using slices/tile groups (also referred to as video tile groups) and/or tiles (also referred to as video tiles), wherein a picture may be partitioned into or encoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered sample values. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a noise suppression filter (NS), a sharpening, a smoothing filters or a collaborative filters, or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, ATMVP sub-blocks edges, sub-block transform (SBT) edges and intra sub-partition (ISP) edges. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may be configured to partition a picture from a video sequence into a sequence of coding tree units (CTUs), and the partitioning unit 262 may partition (or split) a current block 203 into smaller partitions, e.g. smaller blocks of square or rectangular size. For a picture that has three sample arrays, a CTU consists of an N×N block of luma samples together with two corresponding blocks of chroma samples. The maximum allowed size of the luma block in a CTU is specified to be 128×128 in the developing versatile video coding (VVC), but it can be specified to be value rather than 128×128 in the future, for example, 256×256. The CTUs of a picture may be clustered/grouped as slices/tile groups, tiles or bricks. A tile covers a rectangular region of a picture, and a tile can be divided into one or more bricks. A brick consists of a number of CTU rows within a tile. A tile that is not partitioned into multiple bricks can be referred to as a brick. However, a brick is a true subset of a tile and is not referred to as a tile. There are two modes of tile groups are supported in VVC, namely the raster-scan slice/tile group mode and the rectangular slice mode. In the raster-scan tile group mode, a slice/tile group contains a sequence of tiles in tile raster scan of a picture. In the rectangular slice mode, a slice contains a number of bricks of a picture that collectively form a rectangular region of the picture. The bricks within a rectangular slice are in the order of brick raster scan of the slice. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quadtree structure similar to the coding tree for the CU.

In embodiments, e.g., according to the latest video coding standard currently in development, which is referred to as Versatile Video Coding (VVC), Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

VVC develops a unique signaling mechanism of the partition splitting information in quadtree with nested multi-type tree coding tree structure. In the signaling mechanism, a coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signaled to indicate whether the node is further partitioned; when a node is further partitioned, a second flag (mtt_split_cu_vertical_flag) is signaled to indicate the splitting direction, and then a third flag (mtt_split_cu_binary_flag) is signaled to indicate whether the split is a binary split or a ternary split. Based on the values of mtt_split_cu_vertical_flag and mtt_split_cu_binary_flag, the multi-type tree slitting mode (MttSplitMode) of a CU can be derived by a decoder based on a predefined rule or a table. It should be noted, for a certain design, for example, 64×64 Luma block and 32×32 Chroma pipelining design in VVC hardware decoders, TT split is forbidden when either width or height of a luma coding block is larger than 64. TT split is also forbidden when either width or height of a chroma coding block is larger than 32. The pipelining design will divide a picture into Virtual pipeline data units s(VPDUs) which are defined as non-overlapping units in a picture. In hardware decoders, successive VPDUs are processed by multiple pipeline stages simultaneously. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

In addition, it should be noted that, when a portion of a tree node block exceeds the bottom or right picture boundary, the tree node block is forced to be split until the all samples of every coded CU are located inside the picture boundaries.

As an example, the Intra Sub-Partitions (ISP) tool may divide luma intra-predicted blocks vertically or horizontally into 2 or 4 sub-partitions depending on the block size.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC. As an example, several conventional angular intra prediction modes are adaptively replaced with wide-angle intra prediction modes for the non-square blocks, e.g. as defined in VVC. As another example, to avoid division operations for DC prediction, only the longer side is used to compute the average for non-square blocks. And, the results of intra prediction of planar mode may be further modified by a position dependent intra prediction combination (PDPC) method.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DPB 230) and other inter-prediction parameters, e.g. whether the whole reference picture or only apart, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode, direct mode and/or another inter prediction mode may be applied.

For example, Extended merge prediction, the merge candidate list of such mode is constructed by including the following five types of candidates in order: Spatial MVP from spatial neighbor CUs, Temporal MVP from collocated CUs, History-based MVP from an FIFO table, Pairwise average MVP and Zero MVs. And a bilateral-matching based decoder side motion vector refinement (DMVR) may be applied to increase the accuracy of the MVs of the merge mode. Merge mode with MVD (MMVD), which comes from merge mode with motion vector differences. A MMVD flag is signaled right after sending a skip flag and merge flag to specify whether MMVD mode is used for a CU. And a CU-level adaptive motion vector resolution (AMVR) scheme may be applied. AMVR allows MVD of the CU to be coded in different precision. Dependent on the prediction mode for the current CU, the MVDs of the current CU can be adaptively selected. When a CU is coded in merge mode, the combined inter/intra prediction (CIIP) mode may be applied to the current CU. Weighted averaging of the inter and intra prediction signals is performed to obtain the CIIP prediction. Affine motion compensated prediction, the affine motion field of the block is described by motion information of two control point (4-parameter) or three control point motion vectors (6-parameter). Subblock-based temporal motion vector prediction (SbTMVP), which is similar to the temporal motion vector prediction (TMVP) in HEVC, but predicts the motion vectors of the sub-CUs within the current CU. Bi-directional optical flow (BDOF), previously referred to as BIO, is a simpler version that requires much less computation, especially in terms of number of multiplications and the size of the multiplier. Triangle partition mode, in such a mode, a CU is split evenly into two triangle-shaped partitions, using either the diagonal split or the anti-diagonal split. Besides, the bi-prediction mode is extended beyond simple averaging to allow weighted averaging of the two prediction signals.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode selection unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a noise suppression filter (NSF), a sharpening, a smoothing filters or a collaborative filters, or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, ATMVP sub-blocks edges, sub-block transform (SBT) edges and intra sub-partition (ISP) edges. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode selection unit 360 is configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs) or one or more groups of blocks (e.g. tiles (H.265/HEVC and VVC) or bricks (VVC).

Embodiments of the video decoder 30 as shown in FIG. 3 may be configured to partition and/or decode the picture by using slices/tile groups (also referred to as video tile groups) and/or tiles (also referred to as video tiles), wherein a picture may be partitioned into or decoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of the current block (including, but not limited to, control point motion vectors of affine mode, sub-block motion vectors in affine, planar, and/or ATMVP modes, temporal motion vectors, and so on). For example, the value of the motion vector may be constrained to a predefined range according to its representing bit. If the representing bit of the motion vector is bitDepth, then the range may be $-2^{(bitDepth-1)} \sim 2^{(bitDepth-1)}-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g. the MVs of four 4×4 sub-blocks within one 8×8 block) is constrained such that the maximum difference between integer parts of the four 4×4 sub-block MVs is no more than N pixels, such as no more than 1 pixel, for example. In the following, two methods for constraining the motion vector are provided.

Method 1: Remove the Overflow MSB (Most Significant Bit) by Flowing Operations $$ux = (mvx + 2^{bitDepth}) \% \ 2^{bitDepth} \tag{1}$$

$$mvx = (ux >= 2^{bitDepth-1}) ? (ux - 2^{bitDepth}) : ux \tag{2}$$

$$uy = (mvy + 2^{bitDepth}) \% \ 2^{bitDepth} \tag{3}$$

$$mvy = (uy >= 2^{bitDepth-1}) ? (uy - 2^{bitDepth}) : uy \tag{4}$$

For example, if the value of mvx is −32769, after applying formulas (1) and (2), the resulting value is 32767. In a computer system, decimal numbers may be stored as two's complement. The two's complement of −32769 is 1,0111,1111,1111,1111 (17 bits), then the MSB is discarded, so the resulting two's complement is 0111,1111,1111,1111 (decimal number is 32767), which is same as the output by applying formulas (1) and (2).

$$ux = (mvpx + mvdx + 2^{bitDepth}) \% \ 2^{bitDepth} \tag{5}$$

$$mvx = (ux >= 2^{bitDepth-1}) ? (ux - 2^{bitDepth}) : ux \tag{6}$$

$$uy = (mvpy + mvdy + 2^{bitDepth}) \% \ 2^{bitDepth} \tag{7}$$

$$mvy = (uy >= 2^{bitDepth-1}) ? (uy - 2^{bitDepth}) : uy \tag{8}$$

The operations may be applied during the sum of mvp and mvd, as shown in formulas (5) to (8).

Method 2: Remove the Overflow MSB by Clipping the Value $$vx = \text{Clip3}(-2^{bitDepth-1}, 2^{bitDepth-1}-1, vx)$$

$$vy = \text{Clip3}(-2^{bitDepth-1}, 2^{bitDepth-1}-1, vy)$$

where vx is a horizontal component of a motion vector of an image block or a sub-block, vy is a vertical component of a motion vector of an image block or a sub-block; x, y and z respectively correspond to three input values of the MV clipping process, and the definition of the function Clip3 is as follow:

$$\text{Clip3}(x, y, z) = \begin{cases} x & ; \quad z < x \\ y & ; \quad z > y \\ z & ; \quad \text{otherwise} \end{cases}$$

Figure 4:
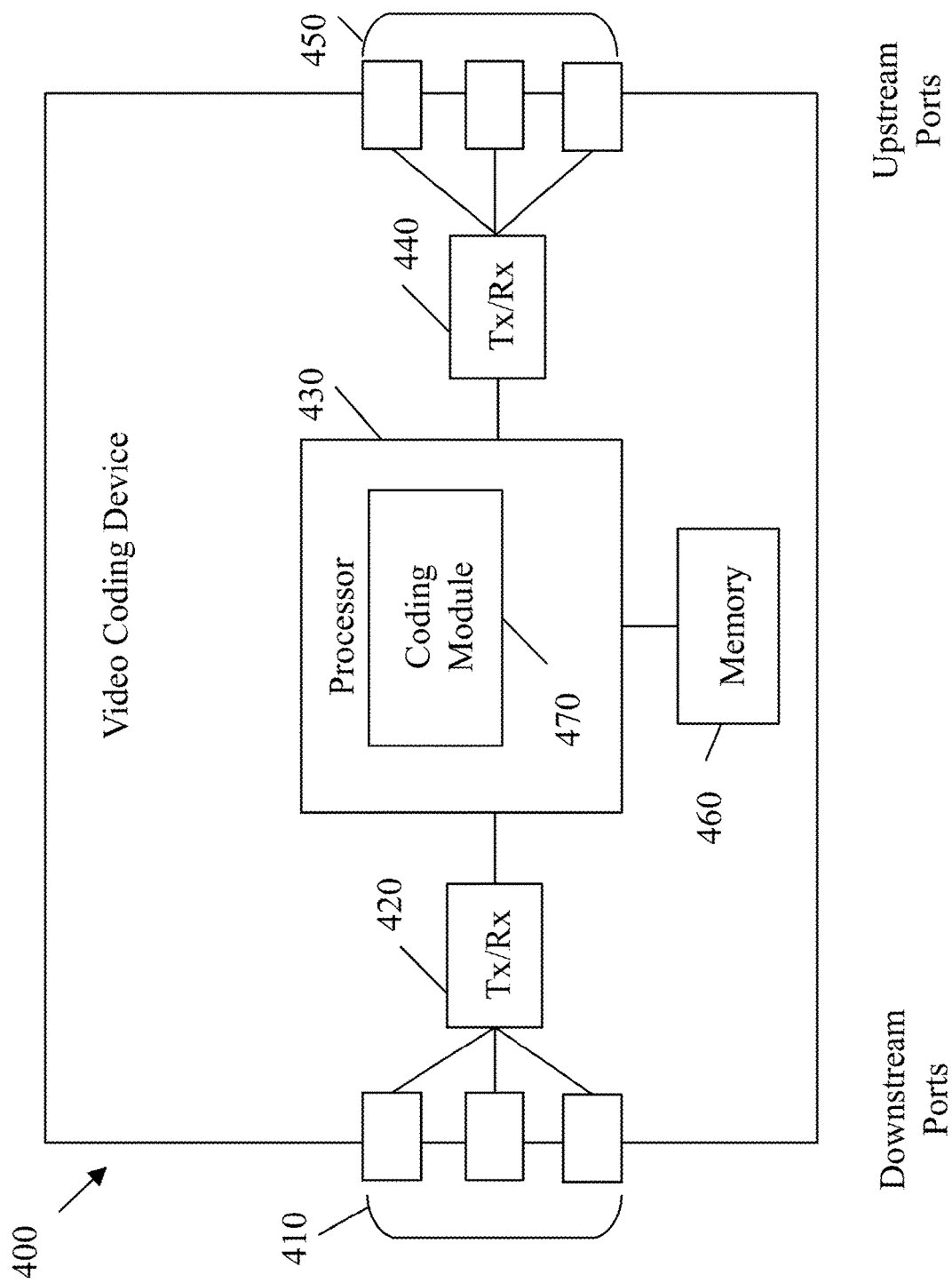
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
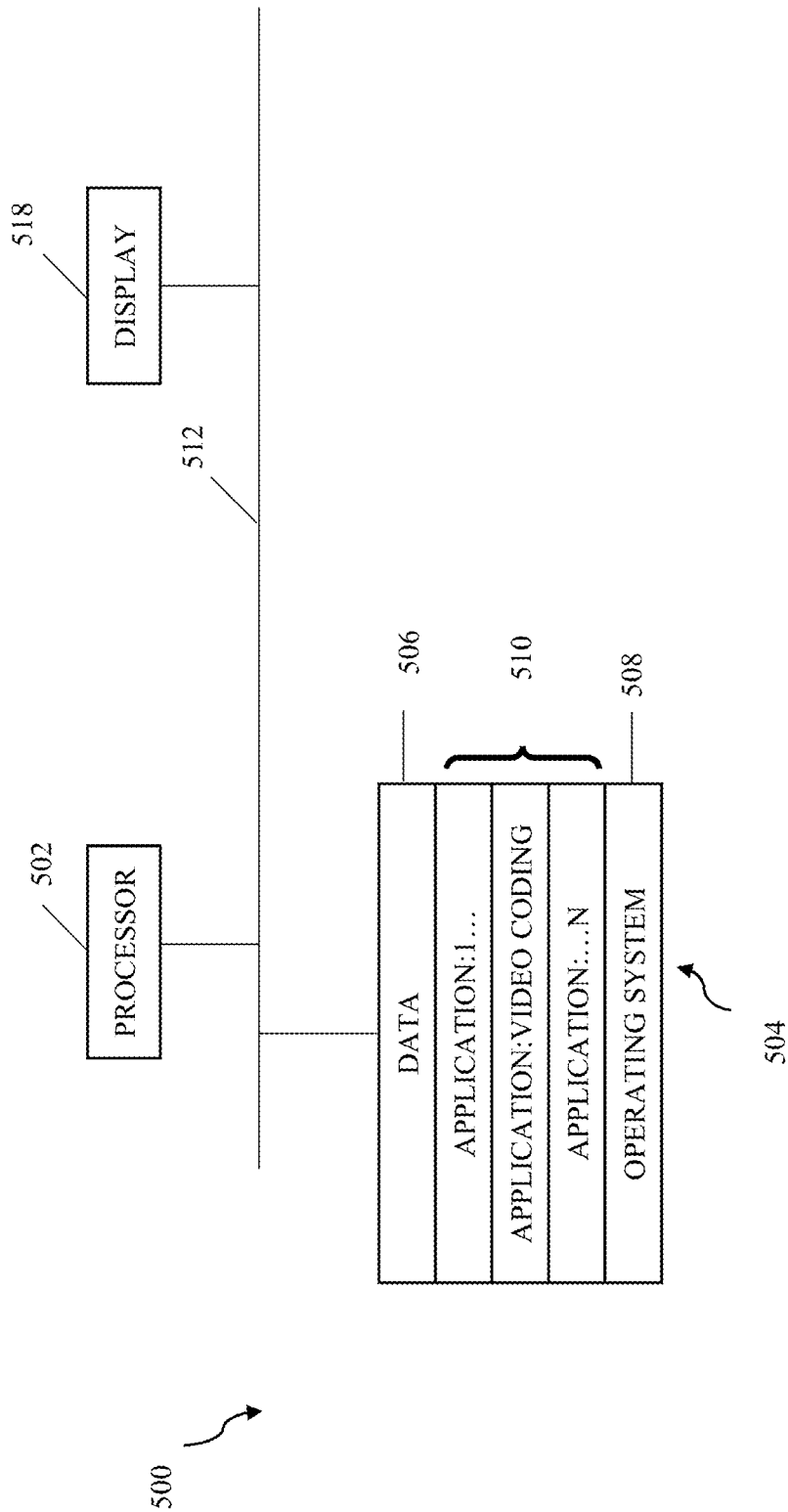
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1A according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Intra Block Copy (IBC)

Intra block copy is a tool that may improve the coding efficiency in particular of screen content. In IBC, a block vector is used to indicate a displacement from the current block to a reference block, which is already reconstructed. That is, the block is coded (encoded or decoded) with the block vector that points to the reference block in the same picture as the current block. The block vector thus indicated a displacement vector from the current block to the reference block. Predication errors may then be coded in the same manner as inter residues are coded, as described further above.

Background on Motion Vector Prediction.

In principle, the motion vectors for motion compensation can be derive in two ways. The motion information could be encoded, where the applicable motion vector is constructed from a motion vector predictor and a motion vector difference. The applicable motion vector predictor is selected from candidates derived from the spatial and temporal neighborhood of the current block. This predictor selection method is usually called advanced motion vector prediction. Further, the motion information can be derived by selection from a configurable set of candidates, without a motion vector difference being encoded. This derivation from a set of candidates is called merge mode.

In the video coding technology filed, spatial motion vector prediction is widely used. A spatial motion vector prediction process means that, during inter prediction process, a motion information of the spatial neighbors of a block is used to predict a motion vector of current block. In some examples, in the merge/merge affine mode and skip mode, the motion vectors from the adjacent spatial neighbors are used. In other example, in a History-based motion vector prediction HMVP mode, motion from history based spatial neighbor are used.

In an example, a merge candidate list is constructed based on the following candidates:
up to four spatial merge candidates that are derived from five spatial neighboring blocks (see FIG. 6);
one temporal merge candidate derived from two temporal, co-located blocks;
additional merge candidates including combined bi-predictive candidates and zero motion vector candidates.

Background on Spatial Candidates.

Figure 6:
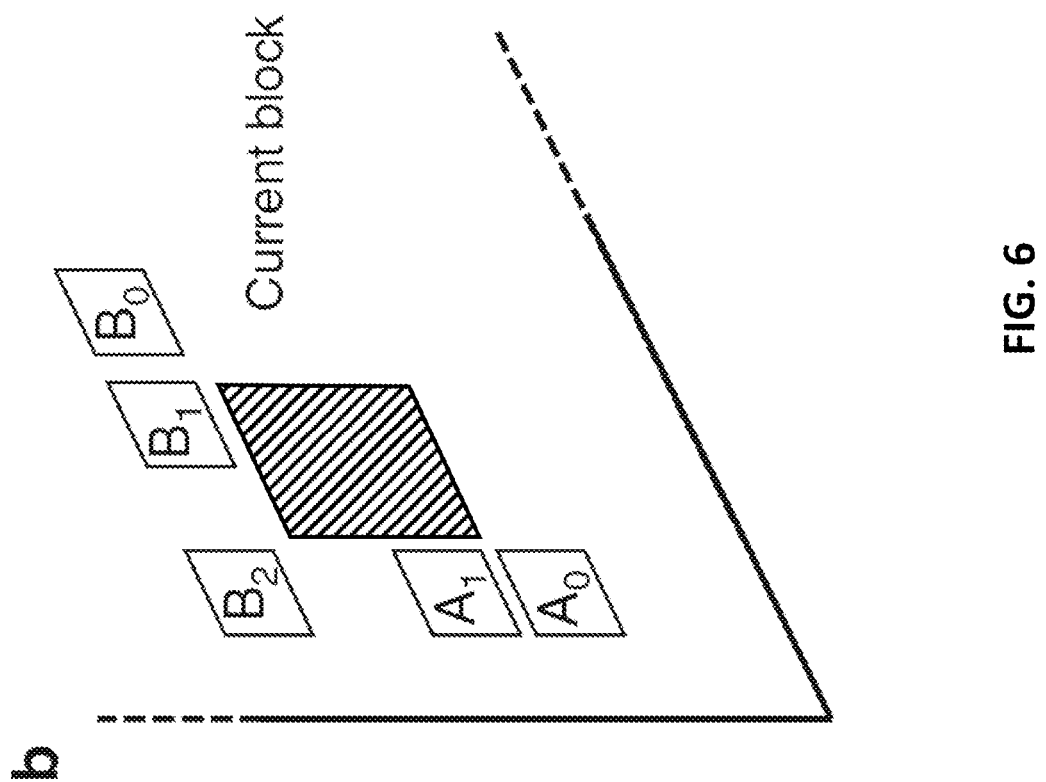
FIG. 6 schematically illustrates an example of a current block and spatial neighbors of the current block.

At first, candidates in the merge candidate list are the spatial neighbors as illustrated in FIG. 6. FIG. 6 schematically illustrates an example of a current block and spatial neighbors of the current block. In the figure, reference sample locations for spatial merge candidate prediction units are shows and denoted as A0, A1, B0, B1 and B2. The locations A0 and A1 indicate the neighboring candidates to the left, the locations B0, B1 and B2 indicate candidates at the top of the current block. For inter-prediction block merging mode, up to four candidates are inserted in the merge list by sequentially checking A1, B1, B0, A0 and B2, in that order. Instead of just checking whether a neighboring block is available and whether there is motion information for the neighboring block, some additional redundancy checks are performed before taking all the motion data of the neighboring block as a merge candidate. These redundancy checks can be divided into two categories for two different purposes:
avoid having candidates with redundant motion data in the list;
prevent merging two partitions that could be expressed by other means which would create redundant syntax.

For instance, if the spatial merging candidates share the same motion information, the duplicated may be eliminated from the candidate list. Further, the locations A1 and B1 may only be included in the set of possible candidates if the current prediction unit is not the right or bottom prediction unit in a coding unit with two partitions, respectively. As indicated above, a maximum of four spatial neighbors may be added to the candidate list.

Background on the Line Buffer.

A line buffer is a buffer for storing data from coding tree units, CTUs. According to versatile vide coding (VVC) document (B. Bross et al.: "Versatile Video Coding (Draft 5)", Joint Video Experts Team (JVET) of ITU-T SG WP 3 and ISO/IEC JTC 1/SC 29/WG 11, Document JVET-N1001, March 2019), CTUs are decoded in a raster order (inside one tile/brick). For some tools, for example, for motion vector merging, for motion vector prediction, for intra block copy and for affine data (motion information) from top CTUs is needed. For this purpose, all the data that may be potentially needed from bottom CTUs during the decoding of a current CTU, is stored in specific buffer. This buffer is called "line buffer". For motion information, which may include motion vectors, MVs and reference indices, a prediction of the bottom line of motion information is stored in the line buffer.

Line buffer can be a buffer which has fast read-write access times, and this kind of buffer is commonly used to store motion information of restricted regions of CTUs that neighboring a current CTU, the motion prediction is performed for the current CTU. Line buffers are fast data are read and/or written for the entire buffer line in parallel.

Figure 7:
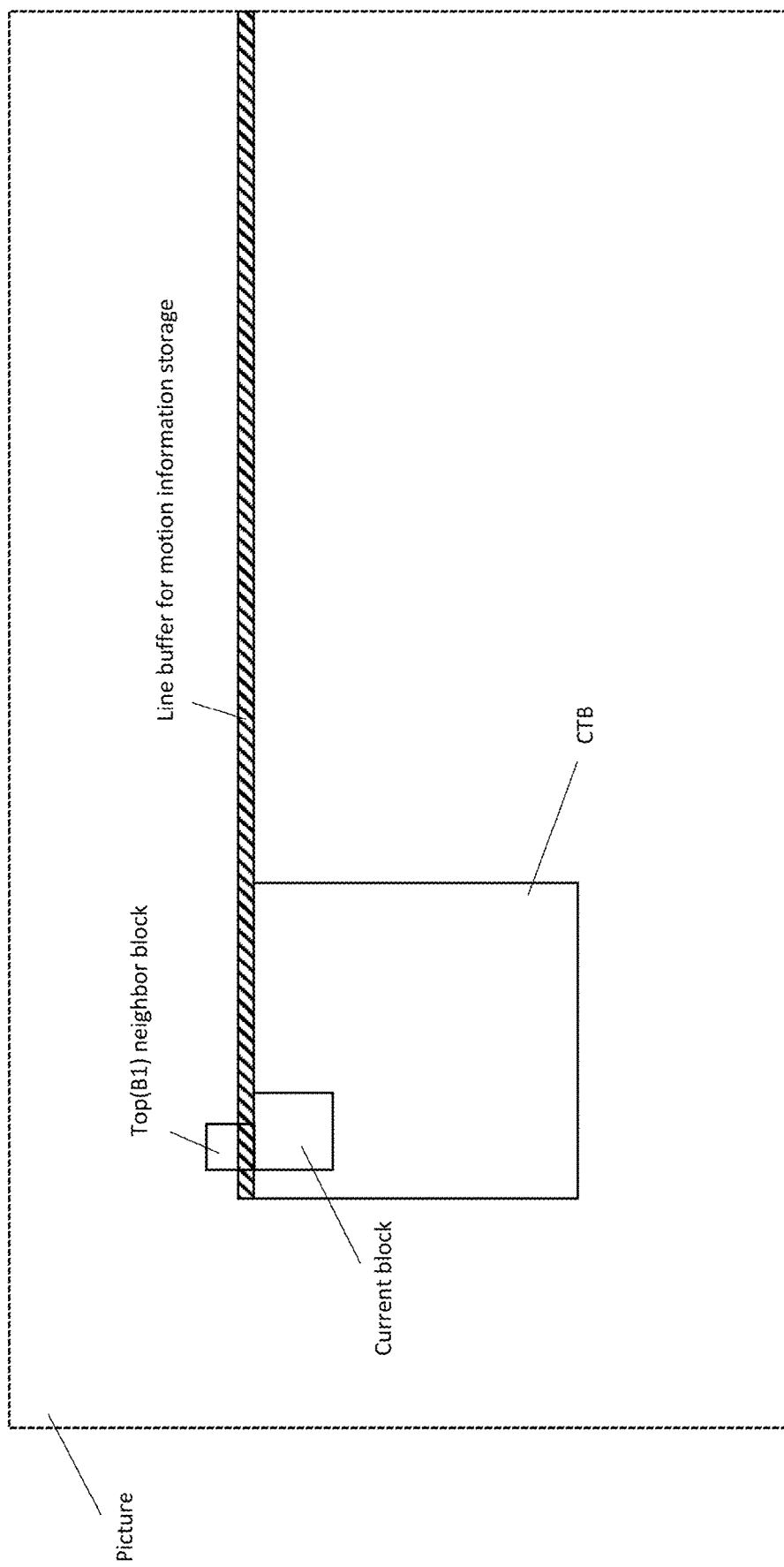
FIG. 7 schematically illustrates a current block and a top neighbor block.

FIG. 7 schematically illustrates a current block and a top neighbor block (CTB). The current block is part of a coding tree block. As can be seen from the figure, the current block is located at the top boundary of the CTB. That is, a top neighboring block like the block B1 indicated in the figure is located within a different CTB, and thus a different coding tree unit (CTU) than the current block. As the motion information of the top neighboring block may be required for motion information prediction of the current blocks, the motion information of the top neighboring block may be stored in the line buffer. The data included in the line buffer, which may be required for motion estimation prediction, for instance, is indicated as a shaded line in FIG. 7.

Although embodiments are described with reference to a line buffer, the present invention is not limited thereto, and the motion information may be stored to/obtained from any other buffer (motion buffer), which is configured to hold stores said motion information.

Background on motion information storage.

According to the VVC document ("Versatile Video Coding (Draft 5)", Document JVET-N1001-v10, $14^{th}$ Meeting of the Joint Video Experts Team (JVET), Geneva, March 2019 and "Algorithm description for Versatile Video Coding and Test Model 5 (VTM 5)", Document JVET-N1002-v2, $14^{th}$ Meeting of the Joint Video Experts Team (JVET), Geneva, March 2019), in some examples, motion information inheritance is used for merge, AMVP, affine and IBC modes. A 4×4 grid is used for motion information storage, one motion information unit per 4 luma pixels is stored in the line buffer.

Figure 8:
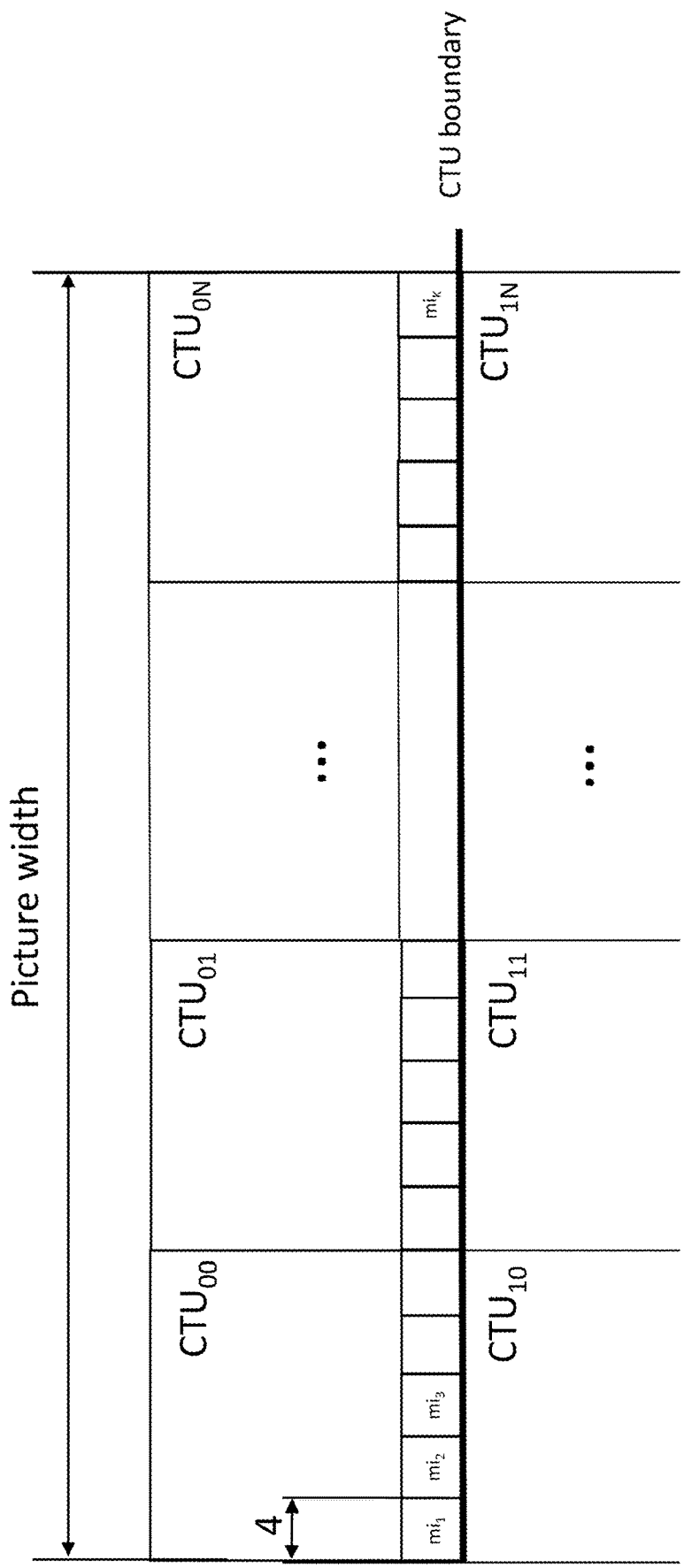
FIG. 8 shows an excerpt of a picture, which is partitioned into multiple coding tree units, and respective motion information units for storage within a line buffer.

This is illustrated in FIG. 8, which sows an excerpt of a picture, which is partitioned into multiple coding tree units. A boundary between a first row of CTUs and a second row of CTUs, which is located below the first row of CTUs is indicated by a bold line. For motion vector derivation of a block within a CTU of the second row of CTUs, motion information from the first row of CTUs may be required. For this purpose, the motion information may be stored in the line buffer for every 4×4 samples of the top CTUs. The motion information for each one within the 4×4 grid is indicated by $mi_i$ in the figure.

One motion information unit may comprise two 18-bit motion vectors (list0 and list1) and two 4-bit reference indices. In total, a size of one motion information unit is equal to (18+18+4)*2=80 bits. This means that, for example, for 4K video, (4096/4)*80=81920 bits (10 Kbytes) of motion information are needed to be stored; for 8K video, 20 Kbytes are needed to be stored.

According to some embodiments of the invention, different grids are used for accessing motion information from top CTUs and from another areas, for merge, motion vector prediction, affine merge, affine motion vector prediction and intra block copy processes. And in some embodiments, an 8-pixel grid is used for accessing motion information located in top CTU.

However, the present invention is not limited thereto, and the size of a motion information unit may be any predetermined size, for instance 8×8, 16×16, 32×32, or other sizes. In an embodiment, an 8-pixel grid (in some embodiments can be 16, 32, 64 or 128 pixel grid) is used for accessing motion information located in a top CTU. In an example, if a bottom line of a top CTU consists of 4×4 blocks, only motion information of every second block is stored. In an example, locations of stored and skipped motion information blocks are depicted in FIG. 9.

Figure 9:
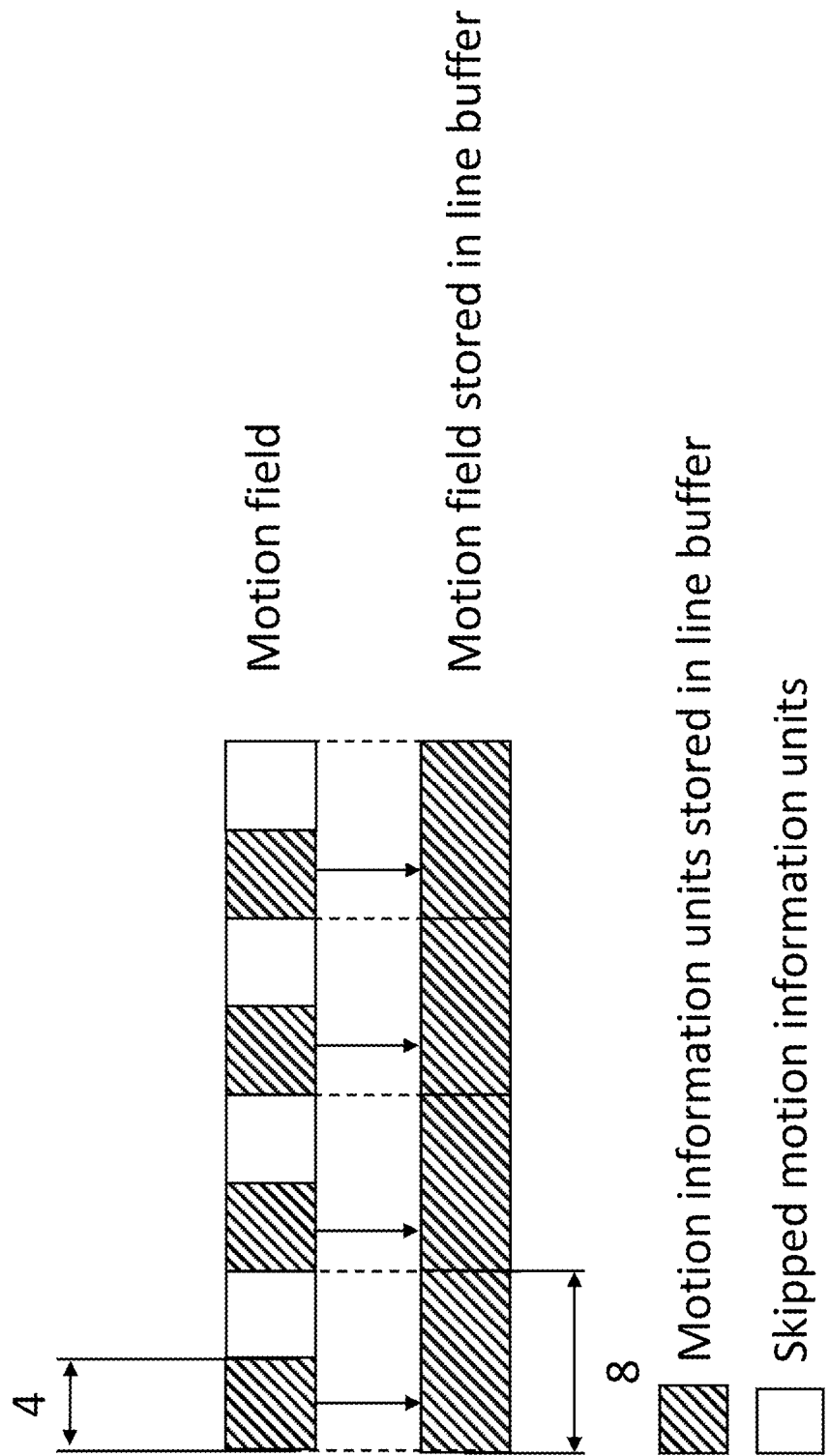
FIG. 9 shows location of stored and skipped motion information blocks in the line buffer.

FIG. 9 shows, in a schematic manner, locations of stored and skipped motion information blocks in the line buffer. Specifically, instead of storing motion information for every 4×4 motion information unit, every second motion information may be skipped, resulting in a motion field stored in the line buffer, which comprises motion information with a reduced granularity. Specifically, the line buffer comprises motion information for every 8 samples in a horizontal direction of the top CTU.

Implementation of this method for the regular merge, AMVP and IBC is straightforward. For instance, when storing the motion information within the line buffer, motion information of every second motion information unit may be skipped.

Figure 10:
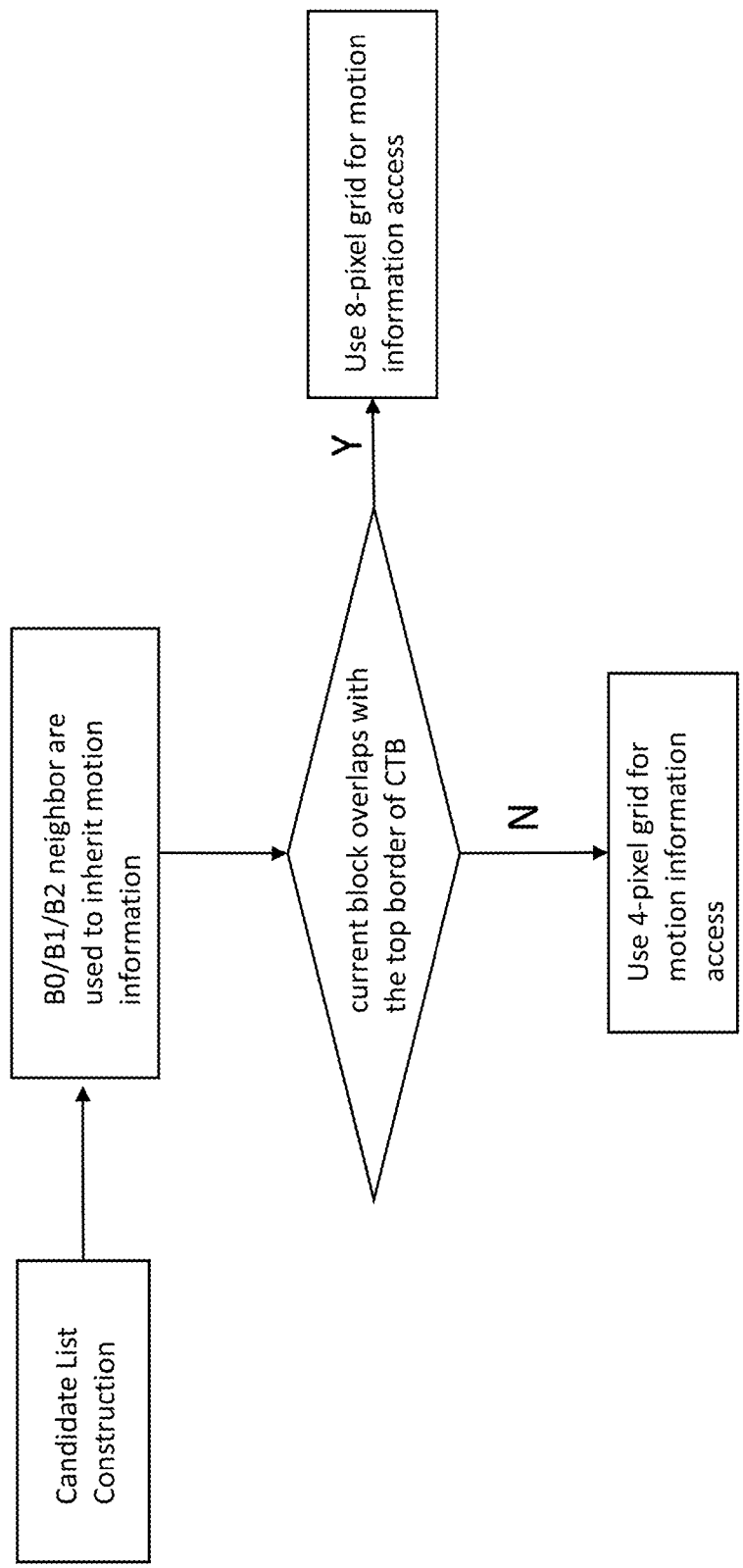
FIG. 10 shows a flowchart of a method.

A flowchart for a decision whether a 4-pixel grid or an 8-pixel grid should be used is illustrated in FIG. 10. During construction of the candidate list for motion information derivation, it may be determined that a top neighboring block by serve as basis for motion information inheritance. Specifically, the motion information of the B0, B1 or B2 top neighboring block may be included in the candidate list. Subsequently, it may be determined whether or not the current block overlaps with the top border of the current CTB. In other words, it is determined whether or not the top neighboring block is located within the same CTB/CTU as the current block. In a case where the current block overlaps with the top border of the CTB, an 8-pixel grid is used when accessing the motion information. In a case where it is determined that the current block does not overlap with the top border of the current CTB, a 4-pixel grid is used for accessing the motion information.

Figure 11:
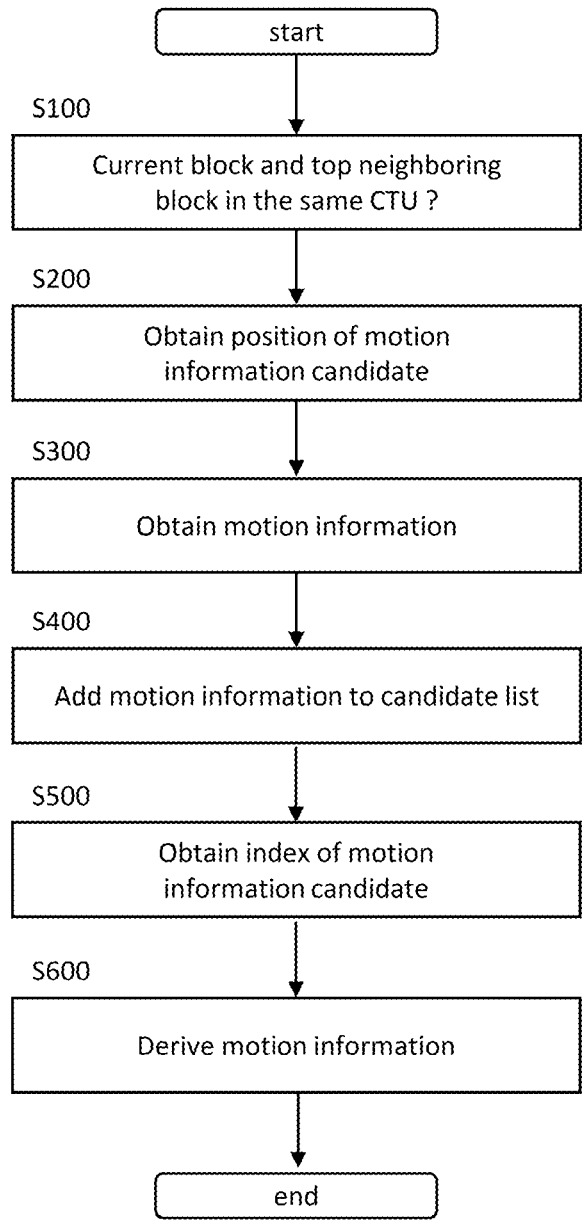
FIG. 11 illustrates the steps of a method according to an embodiment.

A flowchart illustrating the steps of a method according to an embodiment is illustrated in FIG. 11A. In step S100, it is determined whether a current block and a top neighboring block if the current block are in a same coding tree unit, CTU. Further, in step S200, a position of a spatial motion information candidate for the current block is obtained. In step S300, motion information corresponding to the position of the spatial motion information candidate is obtained, depending on whether the current block and the top neighboring block of the current block are in the same CTU. Further, in step S400, the obtained motion information is added to a motion candidate list for the current block. In step S500, a value of a first index of a motion candidate is obtained and, in step S600, motion information of the current block is derived based on the motion information candidate list and the value of the first index.

In another embodiment, the step S100 and S400 to S600 are performed as described above. However, in step S200, a position of the spatial motion information candidate for the current block is obtained, depending on the result of the determination whether the current block and the neighboring block of the current block are in the same CTU. Further, in step S300, motion information corresponding to the position of the spatial motion information candidate is obtained.

In this framework, a position of a motion information candidate may refer to a position of a motion information unit with respect to the current block. In other words, the position may be considered to refer to a position of motion information within a neighboring block and relative to the current block. The position may be expressed by a set of coordinated, namely an x- and a y-coordinate. Motion information may refer to information indicating a motion vector associated with a motion information unit.

That is, a motion vector and reference index inheritance procedure according to an embodiment comprises a modification of motion vector and reference index inheritance across the CTU boundaries. In particular, different grids may be used for accessing motion information located in top CTUs and in current or left CTUs. For accessing motion information located in top CTUs, 8-pixel (can be set in another embodiment to 16, 32, 64, 128, or any other number) grid is used instead of 4-pixel grid that may be used for accessing motion in other cases. Using 8-pixel grid instead of 4-pixel grid in motion information inheritance across CTU boundaries allows to halve the amount of motion information stored in a line buffer.

Affine Parameter Derivation

Figures 12A, 12B:
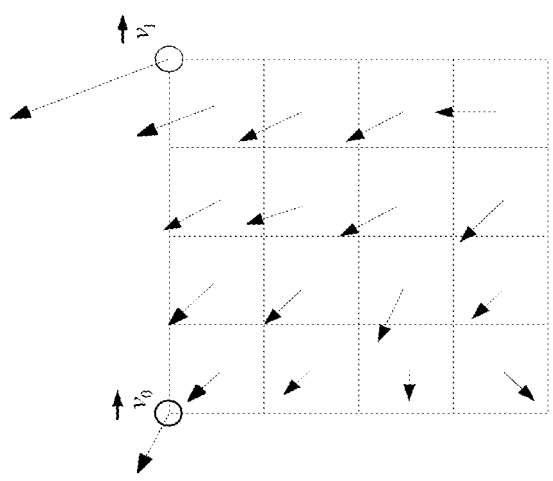
FIG. 12A illustrates schematically a method for affine motion vector derivation.
FIG. 12B gives equations for deriving motion vectors in an affine mode.

Only for affine mode some changes could be done. In particular, embodiments deriving of inherited affine candidates for affine merge and affine AMVP processes is changed, when the used neighboring affine block is located in top CTU, as will be detailed in the following. Motion vectors for a subfield of a current block may be determined as illustrated in FIG. 12A. Specifically, the motion vectors may be determined based on two motion vectors of a neighboring block. In the example given in the figure, the motion vectors are determined using two motion vectors, associated with the top left and the top right corner, respectively. In some cases affine model parameters could be also determined based on three motion vectors (6-parameters affine model). The motion vectors of the field are subsequently determined using the equations given in FIG. 12B. In the equation, $mv_{1,x}$ and $mv_{1,y}$ denote the x- and y-components of the top right vector $v_1$, whereas $mv_{0,x}$ and $mv_{0,y}$ denote the x- and y-components of the top left vector $v_0$. W denotes the width of the block.

Details on a construction process for affine inherited candidates can be found, for instance, in "Versatile Video Coding (Draft 5)", Document JVET-N1001-v10, 14$^{th}$ Meeting of the Joint Video Experts Team (JVET), Geneva, March 2019, in particular section 8.5.5. Details on affine motion compensated prediction can be found, for instance, in "Algorithm description for Versatile Video Coding and Test Model 5 (VTM 5)", Document JVET-N1002-v2, 14$^{th}$ Meeting of the Joint Video Experts Team (JVET), Geneva, March 2019, in particular section 3.4.4.

Figure 12C:
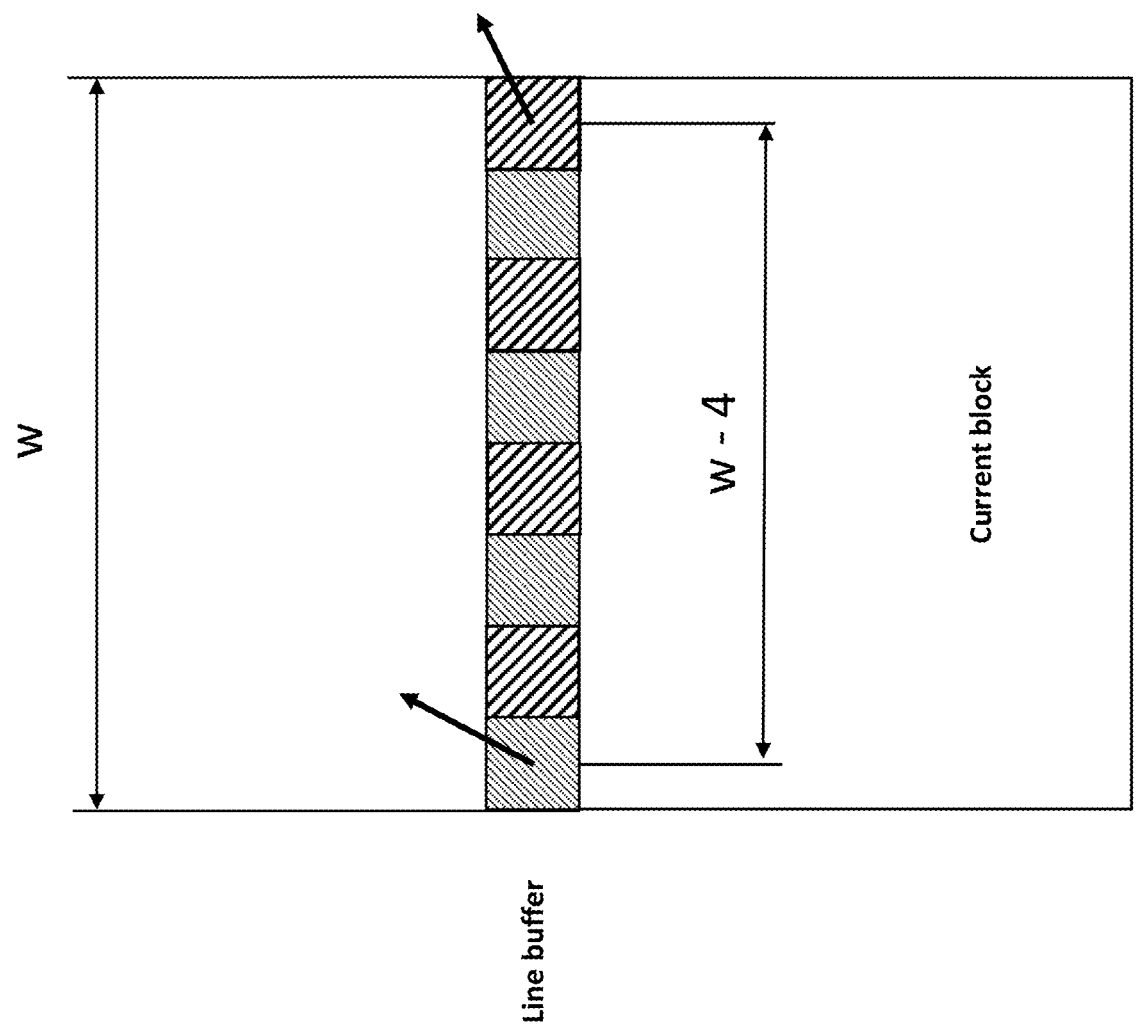
FIG. 12C illustrates an affine motion vector derivation from motion information included in a line buffer.

As according to the current VVC specification, motion information is stored on a 4-pixel grid basis. For a current block adjacent to a top border of a current CTU, motion information from the line buffer is used for motion information derivation in the affine mode. Specifically, as illustrated in FIG. 12C, motion information of a top left motion information unit and a top right motion information unit may be utilized. The distance between the center points of said motion information units is w−4, i.e. not equal to the block width. However, when applying the equations of FIG. 12B, w may bay used nonetheless in order to allow for division implementation using shift operator. As the difference between w and w−4 is rather low, an inaccuracy associated with the calculation may be acceptable.

In an embodiment, of the present disclosure, however, a coarser grid is used for storing motion information in a line buffer. Thus, an inaccuracy introduced by using w instead of w−8, for instance, may increase.

In an embodiment, for correct reference index determination, the following formula may be used $((x+4)>>3)<<3$, where x is horizontal coordinate of the neighboring affine block (this x-coordinate is already stored in line buffer in current VVC design). As the minimum affine block width is equal to 8, and reference indices for all subblocks are the same, the reference index for the neighboring affine block can be determined correctly using this formula when motion information is stored in an 8-pixel grid.

In an embodiment, of the present disclosure, however, a coarser grid is used for storing motion information in a line buffer. Thus, an inaccuracy introduced by using w instead of w−8, for instance, may increase.

Figure 13:
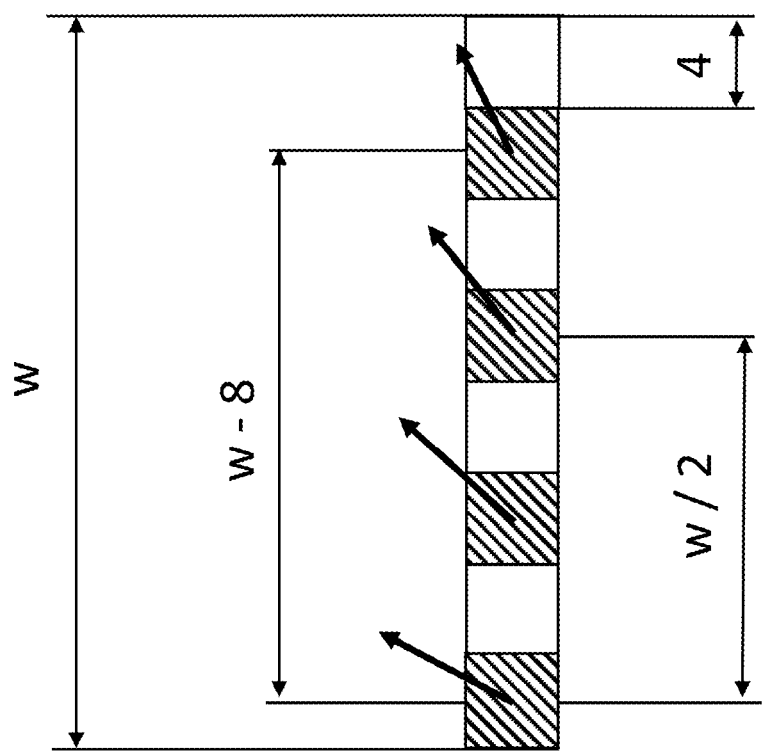
FIG. 13 shows affine model parameters derivation for inherited affine candidates across CTU boundaries.

Thus, in an embodiment, for affine model parameters derivation, instead of subblocks with coordinates x and x+w−1 (where x and w is a horizontal coordinate and width of the neighboring affine block, respectively), subblocks with coordinates x and x+w/2 may be used. In another embodiment, subblocks with coordinates x+4 and x+min(4+w/2, w−1)) can be used. After converting to 8-pixel aligned coordinates ((x>>3)<<3), the distance between x and x+w−1 is equal to w−8, as depicted in FIG. 13, and w−8 can be not a power of two.

In other words, when the positions x and x+w−1 are used, their distance is w−8, which is not necessarily a power of two, which may lead to some degree of worsening in the implementation, as multiplications/divisions cannot be performed by utilizing shift operators, which may in turn cause drawbacks in processing speed. Further, utilizing w instead of w−8 when performing the division may introduce large inaccuracies in motion vector derivation.

Thus, according to an embodiment, for motion vector derivation, subblocks with coordinates x and x+w/2 may be used, which may prevent worsening of processing speed while at the same time preventing an introduction of inaccuracies. In some examples, both of the embodiments (x and x+w/2 and x+4 and x+min(4+w/2, w−1)) allow to use w/2 (which is a power of two) in model derivation equations, so a division-free implementation may be preserved. A default affine model parameters derivation method (with using w instead of w−8) also can be used in another embodiment. In an embodiment, an affine model inheritance across CTU boundaries can be disabled, when the x coordinate of the top affine neighboring block is not a multiple of 8. Although in the embodiment, the affine model inheritance across CTU boundaries can be disable when the x coordinate of the top affine neighboring block is not a multiple of 8 (of the grid size), the present disclosure is not limited thereto, and the affine model inheritance across CTU boundaries can be disabled when the x coordinate of the top affine neighboring block is not a multiple of 16, 32, or any other predetermined number. In another embodiment, an affine model inheritance across CTU boundaries can be disabled, when the width of top affine neighboring block is equal to 8. Although in the embodiment, the affine model inheritance across CTU boundaries can be disable when the x coordinate of the top affine neighboring block is equal to 8, the present disclosure is not limited thereto, and the affine model inheritance across CTU boundaries can be disabled when the x coordinate of the top affine neighboring block equal to 16, 32, or any other predetermined number. According to embodiments of the invention, an 8-pixel grid is used in motion information inheritance across CTU boundaries, this process could allow to halve the amount of motion information stored in a line buffer (in comparison to a 4-pixel grid). For 4K video the line buffer size is reduced by 5 Kbytes, for 8K video is reduced by 10 Kbytes. Further, in an embodiment where a 16-pixel grid is used in motion information inheritance across CTU boundaries, the amount of motion information to be stored in the line buffer could be quartered. In general, using a larger grid for in motion information inheritance across CTU boundaries may allow for reducing the data amount to be stored in the line buffer.

Embodiments of this invention can be used in the following processes:
Motion vector and reference index merging
Motion vector prediction
Affine merge
Affine motion vector prediction
Intra block copy processes.

The Intra block copy process is a scheme, wherein a previously encoded block can be used as a predictor or a current clock. This approach works efficiently on screen content coding, for instance, as there are usually many repeated patterns in screen content video, such that intra block copy may remove the redundancy in a highly efficient manner.

However, the present invention is not limited to the above-mentioned processes and may be applied to other processes. Background information and an example process for determining a merge list may be found, for instance, in JVET-N1001-v10, section 8.5.2.2, or JVET-N1002-v2, section 3.4.1. Background information and an example process for determining a motion vector predictors list may be found, for instance, in JVET-N1002-v2, section 2.5.2.8. Background information and an example process for determining an affine inherited candidate list may be found, for instance, in JVET-N1001-v10, section 8.5.5.5, or JVET-N1002-v2, section 3.4.4.1. Background information and an example process for determining an affine constructed candidate list may be found, for instance, in JVET-N1002-v2, section 3.4.4.1. Background information and an example process for determining a subblock merge list may be found, for instance, in JVET-N1001-v10, section 8.5.5.2, or JVET-N1002-v2, section 3.4.5. Background information and an example process for determining an affine motion vector predictor list may be found, for instance, in JVET-N1001-v10, section 8.5.5.7, or JVET-N1002-v2, section 3.4.4.2. Background information and an example process for determining an intra block copy merge list may be found, for instance, in JVET-N1001-v10, sections 8.6 and 8.6.2.2, or JVET-N1002-v2, section 3.9.1.

Although embodiments of the invention have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Further embodiments are given in the following.

Provided is a method for deriving motion information for a coding block comprising: determining whether a current block and a top neighboring block of the current block are in a same coding tree unit (CTU) or not; obtaining spatial motion information candidate position for the current block; obtaining motion information corresponding to the spatial motion information candidate position, depending on the result of whether the current block and top neighboring block of the current block are in the same CTU; adding the obtained motion information to a motion information candidate list for the current block; obtaining a value of a first index of a motion information candidate; deriving motion information of the current block based on the motion information candidate list and the value of the first index.

In an embodiment, the motion information corresponding to the spatial motion information candidate position is obtained according to the following process, when the current block and top neighboring block of the current block are in the same CTU: obtaining a horizontal coordinate in a motion buffer, by division of horizontal coordinate of the spatial motion information candidate by a first value N, wherein N is an integer value that is a power of two; obtaining a vertical coordinate in the motion buffer, by division of vertical coordinate of the spatial motion information candidate by the first value N.

In an embodiment, the motion information corresponding to the spatial motion information candidate position is obtained according to the following process, when the current block and top neighboring block of the current block are not in the same CTU: obtaining a horizontal coordinate in a motion buffer, by division of horizontal coordinate of the spatial motion information candidate by a second value M, where M is an integer value that is a power of two; obtaining a vertical coordinate in the motion buffer, by division of vertical coordinate of the spatial motion information candidate by a third value K, wherein K is an integer value that is a power of two.

In an embodiment, N is equal to 4.

In an embodiment, M is equal to 8.

In an embodiment, the first value N is equal to the third value K.

In an embodiment, the motion information candidate list is a merge list.

In an embodiment, the motion information candidate list is a motion vector predictors list (AMVP list).

In an embodiment, the motion information candidate list is an affine inherited candidate list.

In an embodiment the motion information candidate list is an affine constructed candidate list.

In an embodiment, the motion information candidate list is a subblock merge list.

In an embodiment, the motion information candidate list is an affine motion vector predictor list.

In an embodiment, the motion information candidate list is an intra block copy merge list.

In an embodiment, an inheritance of affine motion model from a neighboring block is forbidden if one or any combination of the following conditions are met:
  the neighboring block is a top neighboring block for the current block;
  the neighboring block and the current block is not in the same CTU;
  the neighboring block width equal to the second value M.

In an embodiment, an inheritance of affine motion model from a neighboring block is forbidden if one or any combination of the following conditions are met:
  the neighboring block is a top neighboring block for the current block;
  the neighboring block and the current block is not in the same CTU;
  the horizontal coordinate of the neighboring block is not a multiple of second value M.

Further provided is a method for deriving motion information for a coding block comprising: determining whether a current block and a top neighboring block of the current block are in a same coding tree unit (CTU) or not; obtaining spatial motion information candidate position for the current block, depending on the result of whether the current block and top neighboring block of the current block are in the same CTU; obtaining motion information corresponding to the spatial motion information candidate position; adding the obtained motion information to a motion information candidate list for the current block; obtaining a value of a first index of a motion information candidate; deriving motion information of the current block based on the motion information candidate list and the value of the first index.

In an embodiment, the spatial motion information candidate position is obtained according to the following process, when the current block and top neighboring block of the current block are in the same CTU: obtaining a horizontal coordinate in a motion buffer, by division of horizontal coordinate of the spatial motion information candidate by a first value N, wherein N is an integer value that is a power of two; obtaining a vertical coordinate in the motion buffer, by division of vertical coordinate of the spatial motion information candidate by the first value N.

In an embodiment, the spatial motion information candidate position is obtained according to the following process, when the current block and top neighboring block of the current block are not in the same CTU: obtaining a horizontal coordinate in a motion buffer, by division of horizontal coordinate of the spatial motion information candidate by a second value M, where M is an integer value that is a power of two; obtaining a vertical coordinate in the motion buffer, by division of vertical coordinate of the spatial motion information candidate by a third value K, wherein K is an integer value that is a power of two.

In an embodiment, N is equal to 4.

In an embodiment, M is equal to 8.

In an embodiment, the first value N is equal to the third value K.

In an embodiment, the motion information candidate list is a merge list.

In an embodiment, the motion information candidate list is a motion vector predictors list (AMVP list).

In an embodiment, the motion information candidate list is an affine inherited candidate list.

In an embodiment, the motion information candidate list is an affine constructed candidate list.

In an embodiment, the motion information candidate list is a subblock merge list.

In an embodiment, the motion information candidate list is an affine motion vector predictor list.

In an embodiment, the motion information candidate list is an intra block copy merge list.

In an embodiment, an inheritance of affine motion model from a neighboring block is forbidden if one or any combination of the following conditions are met:
  the neighboring block is a top neighboring block for the current block;
  the neighboring block and the current block is not in the same CTU;
  the neighboring block width equal to the second value M.

In an embodiment, an inheritance of affine motion model from a neighboring block is forbidden if one or any combination of the following conditions are met:
  the neighboring block is a top neighboring block for the current block;
  the neighboring block and the current block is not in the same CTU;
  the horizontal coordinate of the neighboring block is not a multiple of second value M.

Further provided is a device comprising processing circuitry configured to perform any one of the above methods.

Further provided is computer program product comprising program code which when executed by a processing device causes the processing device to perform any one of the above methods.

Further provided is a decoder, comprising: one or more processors; and a non-transitory computer-readable storage medium coupled to the processors and storing programming for execution by the processors, wherein the programming, when executed by the processors, configures the decoder to carry out any one of the above methods.

Further provided is an encoder (20) comprising processing circuitry for carrying out any one of the above methods.

Further provided is a decoder (30) comprising processing circuitry for carrying out any one of the above methods.

Further provided is a computer program product comprising a program code for performing any one of the above methods.

Further provided is a decoder, comprising: one or more processors; and a non-transitory computer-readable storage medium coupled to the processors and storing programming for execution by the processors, wherein the programming, when executed by the processors, configures the decoder to carry out any one of the above methods.

Further provided is an encoder, comprising: one or more processors; and a non-transitory computer-readable storage medium coupled to the processors and storing programming for execution by the processors, wherein the programming, when executed by the processors, configures the encoder to carry out any one of the above methods.

Further provided is a non-transitory computer-readable medium carrying a program code which, when executed by a computer device, causes the computer device to perform any one of the above methods.

Following is an explanation of the applications of the encoding method as well as the decoding method as shown in the above-mentioned embodiments, and a system using them.

Figure 14:
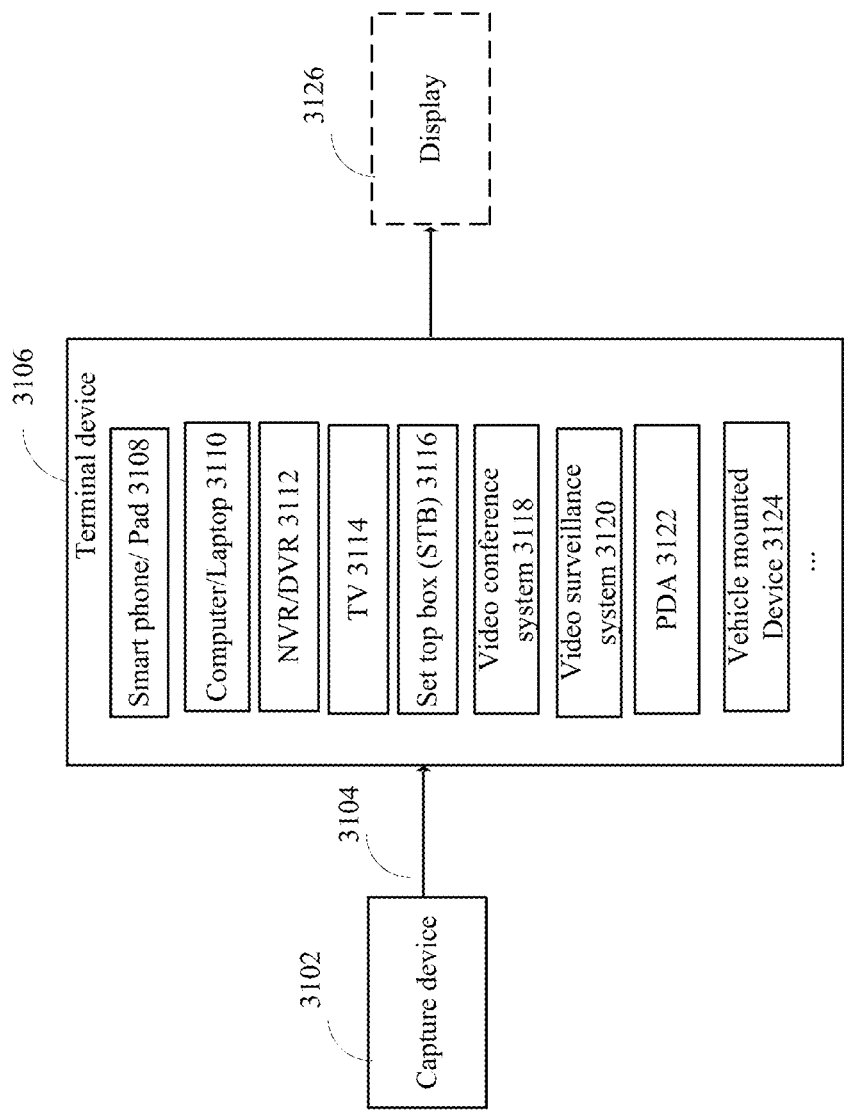
FIG. 14 is a block diagram showing an example structure of a content supply system 3100 which realizes a content delivery service.

FIG. 14 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 15:
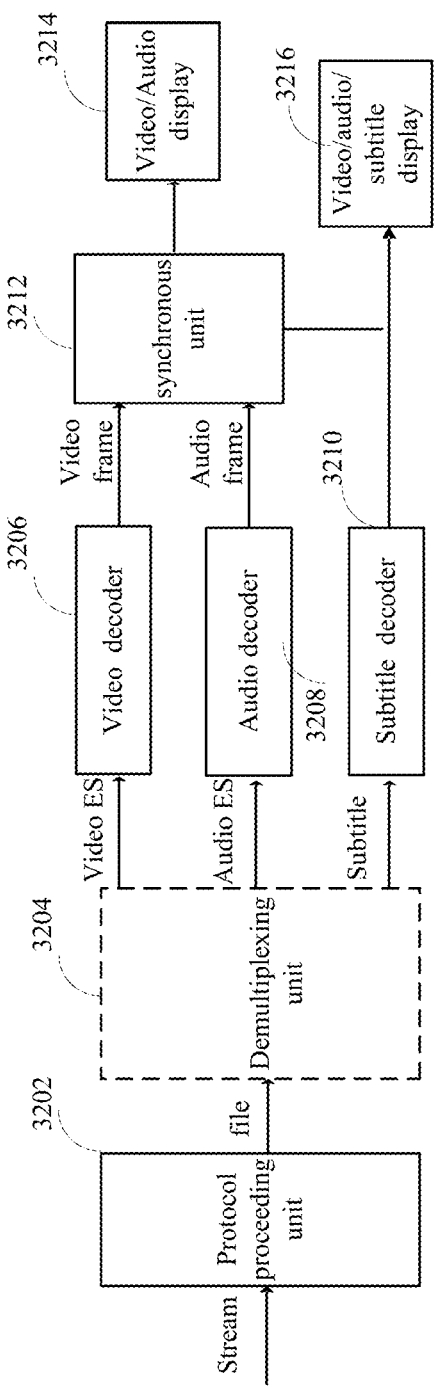
FIG. 15 is a block diagram showing a structure of an example of a terminal device.

FIG. 15 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 15) before feeding it to the synchronous unit 3212. Similarly, the audio frame may store in a buffer (not shown in FIG. 15) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present invention is not limited to the above-mentioned system, and either the picture encoding device or the picture decoding device in the above-mentioned embodiments can be incorporated into other system, for example, a car system.

Mathematical Operators

The mathematical operators used in this disclosure are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
Addition
Subtraction (as a two-argument operator) or negation (as a unary prefix operator)
Multiplication, including matrix multiplication
Exponentiation. Specifies x to the power of y. In other contexts, such notation is used for superscripting not intended for interpretation as exponentiation.
Integer division with truncation of the result toward zero. For example, 7/4 and −7/−4 are truncated to 1 and −7/4 and 7/−4 are truncated to −1.
Used to denote division in mathematical equations where no truncation or rounding is intended.
Used to denote division in mathematical equations where no truncation or rounding is intended.
The summation of f(i) with i taking all integer values from x up to and including y.
Modulus. Remainder of x divided by y, defined only for integers x and y with x>=0 and y>0.

Logical Operators

The following logical operators are defined as follows:
x && y Boolean logical "and" of x and y
x||y Boolean logical "or" of x and y
! Boolean logical "not"
x ? y:z If x is TRUE or not equal to 0, evaluates to the value of y; otherwise, evaluates to the value of z.

Relational Operators

The following relational operators are defined as follows:
> Greater than
>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

-- Decrement, i.e., x-- is equivalent to x=x-1; when used in an array index, evaluates to the value of the variable prior to the decrement operation.

+= Increment by amount specified, i.e., x+=3 is equivalent to x=x+3, and x+=(-3) is equivalent to x=x+(-3).

-=Decrement by amount specified, i.e., x-=3 is equivalent to x=x-3, and x-=(-3) is equivalent to x=x-(-3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$\text{Abs}(x) = \begin{cases} x & ; \quad x >= 0 \\ -x & ; \quad x < 0 \end{cases}$$

A sin(x) the trigonometric inverse sine function, operating on an argument x that is in the range of −1.0 to 1.0, inclusive, with an output value in the range of
−π÷2 to π÷2, inclusive, in units of radians A tan(x) the trigonometric inverse tangent function, operating on an argument x, with an output value in the range of −π÷2 to π÷2, inclusive, in units of radians $$\text{Atan2}(y, x) = \begin{cases} \text{Atan}\left(\frac{y}{x}\right) & ; \quad x > 0 \\ \text{Atan}\left(\frac{y}{x}\right) + \pi & ; \quad x < 0 \;\&\&\; y >= 0 \\ \text{Atan}\left(\frac{y}{x}\right) - \pi & ; \quad x < 0 \;\&\&\; y < 0 \\ +\frac{\pi}{2} & ; \quad x == 0 \;\&\&\; y >= 0 \\ -\frac{\pi}{2} & ; \quad \text{otherwise} \end{cases}$$

Ceil(x) the smallest integer greater than or equal to x.
Clip1$_Y$(x)=Clip3(0, (1<<BitDepth$_Y$)−1,x)
Clip1$_C$(x)=Clip3(0, (1<<BitDepth$_C$)−1, x)

$$\text{Clip3}(x, y, z) = \begin{cases} x & ; \quad z < x \\ y & ; \quad z > y \\ z & ; \quad \text{otherwise} \end{cases}$$

Cos(x) the trigonometric cosine function operating on an argument x in units of radians.
Floor(x) the largest integer less than or equal to x.

$$\text{GetCurrMsb}(a, b, c, d) = \begin{cases} c + d & ; \quad b - a >= d/2 \\ c - d & ; \quad a - b > d/2 \\ c & ; \quad \text{otherwise} \end{cases}$$

Ln(x) the natural logarithm of x (the base-e logarithm, where e is the natural logarithm base constant 2.718 281 828 . . . ).
Log 2(x) the base-2 logarithm of x.
Log 10(x) the base-10 logarithm of x.

$$\text{Min}(x, y) = \begin{cases} x & ; \quad x <= y \\ y & ; \quad x > y \end{cases}$$

$$\text{Max}(x, y) = \begin{cases} x & ; \quad x >= y \\ y & ; \quad x < y \end{cases}$$

Round(x)=Sign(x)*Floor(Abs(x)+0.5)

$$\text{Sign}(x) = \begin{cases} 1 & ; \quad x > 0 \\ 0 & ; \quad x == 0 \\ -1 & ; \quad x < 0 \end{cases}$$

Sin(x) the trigonometric sine function operating on an argument x in units of radians
Sqrt(x)=√x
Swap(x,y)=(y, x)
Tan(x) the trigonometric tangent function operating on an argument x in units of radians Order of operation precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table) operations (with operands x, y, and z)

"x++", "x− −"
"!x", "−x" (as a unary prefix operator)
$x^y$

"x * y", "x/y", "x ÷ y", "$\frac{x}{y}$", "x % y"

"x + y", "x − y" (as a two-argument operator), "$\sum_{i=x}^{y} f(i)$"

"x << y", "x >> y"
"x < y", "x <= y", "x > y", "x >= y"
"x = = y", "x != y"
"x & y"
"x | y"
"x && y"
"x | | y"
"x ? y : z"
"x..y"
"x = y", "x += y", "x −= y"

Text Description of Logical Operations
In the text, a statement of logical operations as would be described mathematically in the following form:

if( condition 0 )
    statement 0
else if( condition 1 )
    statement 1
...
else /* informative remark on remaining condition */
    statement n may be described in the following manner:
    ... as follows / ... the following applies:
    - If condition 0, statement 0
    - Otherwise, if condition 1, statement 1
    - ...
    - Otherwise (informative remark on remaining condition), statement n Each "If . . . Otherwise, if . . . Otherwise, . . . "statement in the text is introduced with" . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . "statements can be identified by matching" . . . as follows" or " . . . the following applies" with the ending "Otherwise, . . . ".

In the text, a statement of logical operations as would be described mathematically in the following form:

if( condition 0a   &&   condition 0b )
    statement 0
else if( condition 1a   | |   condition 1b )
    statement 1
...
else
    statement n may be described in the following manner:

... as follows / ... the following applies:
    - If all of the following conditions are true, statement 0:
      - condition 0a
      - condition 0b -continued

- Otherwise, if one or more of the following conditions are true, statement 1:
      - condition 1a
      - condition 1b
    - ...
    - Otherwise, statement n In the text, a statement of logical operations as would be described mathematically in the following form:
    if(condition 0)
      statement 0
    if(condition 1)
      statement 1
may be described in the following manner:
    When condition 0, statement 0
    When condition 1, statement 1.

Although embodiments of the invention have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

What is claimed is:
1. A method for deriving motion information for a current block, comprising:
    determining, by a decoder, whether or not the current block and a top neighboring block of the current block are in a same coding tree unit (CTU);

obtaining, by the decoder, a position of a spatial motion information candidate for the current block;

obtaining, by the decoder, motion information corresponding to the position of the spatial motion information candidate, based on whether or not the current block and the top neighboring block of the current block are in the same CTU;

adding, by the decoder, the obtained motion information to a motion information candidate list for the current block;

obtaining, by the decoder, a value of a first index of a motion information candidate; and deriving, by the decoder, motion information of the current block based on the motion information candidate list and the value of the first index, and wherein the value of the first index is determined based on a formula:

$$((x+4)>>3)<<3$$

where x is the position of the spatial motion information candidate for the current block.

2. The method of claim 1, wherein based on the current block and the top neighboring block of the current block being in the same CTU, obtaining the motion information corresponding to the position of the spatial motion information candidate comprises:

obtaining a horizontal coordinate in a motion buffer, by division of a horizontal coordinate of the spatial motion information candidate by a first value N, wherein N is an integer value that is a power of two; and obtaining a vertical coordinate in the motion buffer, by division of a vertical coordinate of the spatial motion information candidate by the first value N.

3. The method of claim 2, wherein N is equal to 4.

4. The method of claim 1, wherein based on the current block and the top neighboring block of the current block not being in the same CTU, obtaining the motion information corresponding to the position of the spatial motion information candidate comprises:

obtaining a horizontal coordinate in a motion buffer, by division of a horizontal coordinate of the spatial motion information candidate by a second value M, where M is an integer value that is a power of two; and obtaining a vertical coordinate in the motion buffer, by division of a vertical coordinate of the spatial motion information candidate by a third value K, wherein K is an integer value that is a power of two.

5. The method of claim 4, wherein M is equal to 8.

6. The method of claim 4, wherein an inheritance of an affine motion model from a neighboring block is forbidden based on the following conditions being met:

the neighboring block is a top neighboring block for the current block;

the neighboring block and the current block are not in the same CTU; and the neighboring block width is equal to the second value M.

7. The method of claim 4, wherein an inheritance of an affine motion model from a neighboring block is forbidden based on the following conditions being met:

the neighboring block is a top neighboring block for the current block;

the neighboring block and the current block are not in the same CTU; and a horizontal coordinate of the neighboring block is not a multiple of the second value M.

8. A method for deriving motion information for a current block, comprising:

determining, by a decoder, whether or not the current block and a top neighboring block of the current block are in a same coding tree unit (CTU);

obtaining, by the decoder, a position of a spatial motion information candidate for the current block, based on whether or not the current block and the top neighboring block of the current block are in the same CTU;

obtaining, by the decoder, motion information corresponding to the position of the spatial motion information candidate;

adding, by the decoder, the obtained motion information to a motion information candidate list for the current block;

obtaining, by the decoder, a value of a first index of a motion information candidate; and deriving, by the decoder, motion information of the current block based on the motion information candidate list and the value of the first index, and wherein the value of the first index is determined based on a formula:

$$((x+4)>>3)<<3$$

where x is the position of the spatial motion information candidate for the current block.

9. The method of claim 8, based on the current block and the top neighboring block of the current block being in the same CTU, obtaining the position of the spatial motion information candidate for the current block comprises:

obtaining a horizontal coordinate in a motion buffer, by division of a horizontal coordinate of the spatial motion information candidate by a first value N, wherein N is an integer value that is a power of two; and obtaining a vertical coordinate in the motion buffer, by division of a vertical coordinate of the spatial motion information candidate by the first value N.

10. The method of claim 8, wherein based on the current block and the top neighboring block of the current block not being in the same CTU, obtaining the position of the spatial motion information candidate for the current block comprises:

obtaining a horizontal coordinate in a motion buffer, by division of a horizontal coordinate of the spatial motion information candidate by a second value M, where M is an integer value that is a power of two; and obtaining a vertical coordinate in the motion buffer, by division of a vertical coordinate of the spatial motion information candidate by a third value K, wherein K is an integer value that is a power of two.

11. A decoder, comprising:

one or more processors; and a non-transitory computer-readable storage medium coupled to the one or more processors and storing programming for execution by the one or more processors, wherein the programming, when executed by the one or more processors, cause the following to be performed by the one or more processors:

determining whether or not a current block and a top neighboring block of the current block are in a same coding tree unit (CTU);

obtaining a position of a spatial motion information candidate for the current block;

obtaining motion information corresponding to the position of the spatial motion information candidate, based on whether or not the current block and the top neighboring block of the current block are in the same CTU;

adding the obtained motion information to a motion information candidate list for the current block;

obtaining a value of a first index of a motion information candidate; and deriving motion information of the current block based on the motion information candidate list and the value of the first index, and wherein the value of the first index is determined based on a formula:

$((x+4)>>3)<<3$ where x is the position of the spatial motion information candidate for the current block.

12. The decoder of claim 11, wherein based on the current block and the top neighboring block of the current block being in the same CTU, obtaining the motion information corresponding to the position of the spatial motion information candidate comprises:

obtaining a horizontal coordinate in a motion buffer, by division of a horizontal coordinate of the spatial motion information candidate by a first value N, wherein N is an integer value that is a power of two; and obtaining a vertical coordinate in the motion buffer, by division of a vertical coordinate of the spatial motion information candidate by the first value N.

13. The decoder of claim 12, wherein N is equal to 4.

14. The decoder of claim 11, wherein based on the current block and the top neighboring block of the current block not being in the same CTU, obtaining the motion information corresponding to the position of the spatial motion information candidate comprises:

obtaining a horizontal coordinate in a motion buffer, by division of a horizontal coordinate of the spatial motion information candidate by a second value M, where M is an integer value that is a power of two; and obtaining a vertical coordinate in the motion buffer, by division of a vertical coordinate of the spatial motion information candidate by a third value K, wherein K is an integer value that is a power of two.

15. The decoder of claim 14, wherein M is equal to 8.

16. The decoder of claim 14, wherein an inheritance of an affine motion model from a neighboring block is forbidden based on the following conditions being met:

the neighboring block is a top neighboring block for the current block;

the neighboring block and the current block are not in the same CTU; and the neighboring block width is equal to the second value M.

17. The decoder of claim 14, wherein an inheritance of an affine motion model from a neighboring block is forbidden based on the following conditions being met:

the neighboring block is a top neighboring block for the current block;

the neighboring block and the current block are not in the same CTU; and a horizontal coordinate of the neighboring block is not a multiple of the second value M.

* * * * *